US010569254B2

(12) United States Patent
Klein et al.

(10) Patent No.: US 10,569,254 B2
(45) Date of Patent: *Feb. 25, 2020

(54) CATALYST SUPPORT AND CATALYSTS PREPARED THEREFROM

(71) Applicant: Advanced Refining Technologies LLC, Columbia, MD (US)

(72) Inventors: Darryl P. Klein, Ellicott City, MD (US); Nan Chen, Berkeley, CA (US); Matthew P. Woods, Pasadena, MD (US); Bruno Nesci, Oak Lawn, IL (US)

(73) Assignee: Advanced Refining Technologies LLC, Columbia, MD (US)

( * ) Notice: Subject to any disclaimer, the term of this patent is extended or adjusted under 35 U.S.C. 154(b) by 412 days.

This patent is subject to a terminal disclaimer.

(21) Appl. No.: 15/446,388

(22) Filed: Mar. 1, 2017

(65) Prior Publication Data

US 2017/0165639 A1    Jun. 15, 2017

Related U.S. Application Data

(63) Continuation of application No. 14/635,407, filed on Mar. 2, 2015, now Pat. No. 9,605,216, which is a
(Continued)

(51) Int. Cl.
*B01J 21/04* (2006.01)
*B01J 37/28* (2006.01)
(Continued)

(52) U.S. Cl.
CPC .............. *B01J 21/04* (2013.01); *B01J 23/00* (2013.01); *B01J 23/85* (2013.01); *B01J 23/883* (2013.01);
(Continued)

(58) Field of Classification Search
CPC ...... B01L 35/04; B01L 21/04; B01L 37/0009; F01N 3/281; F01N 2330/02
See application file for complete search history.

(56) References Cited

U.S. PATENT DOCUMENTS

4,048,060 A    9/1977  Riley
4,066,574 A    1/1978  Tamm
(Continued)

FOREIGN PATENT DOCUMENTS

EP           1932431 B1    8/2006
WO       2005028106 A1    3/2005

OTHER PUBLICATIONS

Dai and Campbell, "Mild Hydrocracking of Heavy Oils with Modified Alumina Based Catalysts", Catalytic Hydroprocessing of Petroleum and Distillates, edited by Oballa and Shih, Marcel Dekker Inc., New York (1994).
(Continued)

*Primary Examiner* — Colleen P Dunn
(74) *Attorney, Agent, or Firm* — Lerner, David, Littenberg, Krumholz & Mentlik, LLP

(57) ABSTRACT

A supported catalyst useful in processes for chemically refining hydrocarbon feedstocks is prepared, the catalyst comprising a metal from Group 6 of the Periodic Table, a metal from Groups 8, 9 or 10 and optionally phosphorous, wherein the metals, and phosphorous when present, are carried on a foraminous carrier or support, the carrier or support, preferably comprises porous alumina having a total pore volume (TPV) of about 0.6 cc/g to about 1.1 cc/g and comprising: (a) equal to or greater than about 78% to about 95% of TPV in pores having a diameter of less than about 200 Angstroms (Å); (b) greater than about 2% to less than about 19% of the TPV in pores having a diameter of about 200 (Å) to less than about 1000 Å; (c) equal to or greater than 3% to less than 12% of the TPV in pores having a
(Continued)

Example of Pore Size Distribution diameter equal to or greater than about 1000 Å; and (d) a pore mode equal to or greater than about 90 Å and less than about 160 Å. Preferably the support exhibits a d50 greater than about 100 Å and less than about 150 Å.

14 Claims, 1 Drawing Sheet

Related U.S. Application Data continuation of application No. 13/822,340, filed as application No. PCT/US2012/049415 on Aug. 3, 2012, now Pat. No. 8,969,242.

(60) Provisional application No. 61/530,108, filed on Sep. 1, 2011.

(51) Int. Cl.

| | |
|---|---|
| *B01J 23/883* | (2006.01) |
| *B01J 35/10* | (2006.01) |
| *B01J 23/00* | (2006.01) |
| *B01J 37/08* | (2006.01) |
| *B01J 23/85* | (2006.01) |
| *C10G 45/04* | (2006.01) |
| *B01J 37/02* | (2006.01) |
| *B01J 27/24* | (2006.01) |
| *C10G 45/10* | (2006.01) |
| *C10G 47/14* | (2006.01) |
| *C10G 65/12* | (2006.01) |
| *C10G 45/08* | (2006.01) |
| *C10G 47/12* | (2006.01) |
| *C10G 65/00* | (2006.01) |
| *C10G 47/10* | (2006.01) |
| *B01J 37/03* | (2006.01) |

(52) U.S. Cl.
CPC .............. *B01J 27/24* (2013.01); *B01J 35/108* (2013.01); *B01J 35/1042* (2013.01); *B01J 35/1047* (2013.01); *B01J 35/1061* (2013.01); *B01J 35/1066* (2013.01); *B01J 37/0201* (2013.01); *B01J 37/08* (2013.01); *B01J 37/28* (2013.01); *C10G 45/04* (2013.01); *C10G 45/08* (2013.01); *C10G 45/10* (2013.01); *C10G 47/10* (2013.01); *C10G 47/12* (2013.01); *C10G 47/14* (2013.01); *C10G 65/00* (2013.01); *C10G 65/12* (2013.01); *B01J 37/031* (2013.01); *C10G 2300/202* (2013.01); *C10G 2300/205* (2013.01); *C10G 2300/206* (2013.01); *C10G 2300/208* (2013.01); *C10G 2300/301* (2013.01)

(56) References Cited

U.S. PATENT DOCUMENTS

| | | | |
|---|---|---|---|
| 4,082,695 A | 4/1978 | Rosinski et al. |
| 4,113,661 A | 9/1978 | Tamm |
| 4,154,812 A | 5/1979 | Sanchez et al. |
| 4,225,421 A | 9/1980 | Hensley, Jr. et al. |
| 4,341,625 A | 7/1982 | Tamm |
| 4,497,909 A | 2/1985 | Itoh et al. |
| 4,738,944 A | 4/1988 | Robinson et al. |
| 4,844,792 A | 7/1989 | Abdo et al. |
| 4,917,791 A | 4/1990 | Kang |
| 4,941,964 A | 7/1990 | Dai et al. |
| 5,047,142 A | 9/1991 | Sherwood, Jr. et al. |
| 5,087,348 A | 2/1992 | Dai et al. |
| 5,089,463 A | 2/1992 | Johnson |
| 5,094,994 A | 3/1992 | Sherwood, Jr. et al. |
| 5,322,616 A | 6/1994 | Dai et al. |
| 5,370,788 A | 12/1994 | Dai et al. |
| 5,389,595 A | 2/1995 | Simpson et al. |
| 5,399,259 A | 3/1995 | Dai et al. |
| 5,416,054 A | 5/1995 | Dai et al. |
| 5,435,908 A | 7/1995 | Nelson et al. |
| 5,436,216 A | 7/1995 | Toyao et al. |
| 5,468,371 A | 11/1995 | Nelson et al. |
| 5,498,586 A | 3/1996 | Dai et al. |
| 5,514,273 A | 5/1996 | Sherwood, Jr. et al. |
| 5,545,602 A | 8/1996 | Nelson et al. |
| 5,616,530 A | 4/1997 | Sherwood, Jr. et al. |
| 5,624,547 A | 4/1997 | Sudhakar et al. |
| 5,827,421 A | 10/1998 | Sherwood, Jr. |
| 5,868,923 A | 2/1999 | Porter et al. |
| 5,928,499 A | 7/1999 | Sherwood, Jr. et al. |
| 5,968,248 A | 10/1999 | Shibasaki et al. |
| 5,968,348 A | 10/1999 | Sherwood, Jr. |
| 6,387,248 B2 | 5/2002 | Sherwood, Jr. et al. |
| 6,403,526 B1 | 6/2002 | Lussier et al. |
| 6,589,908 B1 | 7/2003 | Ginestra et al. |
| 6,919,294 B2 | 7/2005 | Saito et al. |
| 6,928,499 B2 | 8/2005 | Kitakami |
| 6,984,310 B2 | 1/2006 | Ginestra et al. |
| 7,169,294 B2 | 1/2007 | Abe et al. |
| 7,390,766 B1 | 6/2008 | Klein |
| 7,560,407 B2 | 7/2009 | Klein |
| 7,642,212 B2 | 1/2010 | Klein |
| 2002/0000397 A1 | 1/2002 | Sherwood, Jr. et al. |
| 2004/0050754 A1 | 3/2004 | Abe et al. |
| 2004/0126315 A1 | 7/2004 | Saito et al. |
| 2006/0011510 A1 | 1/2006 | Toshima et al. |
| 2009/0255850 A1 | 10/2009 | Bhan et al. |
| 2010/0006475 A1 | 1/2010 | Ginestra |

OTHER PUBLICATIONS

McKnight et al., "Joint ebullated bed catalyst development program results in over 30 % reduction in catalyst usage", EPC bottom of the barrel conference, Athens , 2006.
Dai et al. , "The effect of additives and impregnation stabilizers on hydrodesulfurization activity", ACS 208th national meeting , Aug. 1994.
"High Production Volume (HPV) Chemical Challenge Program, Test Plan, Heavy Fuel Oils Category", Submitted to the US EPA, The Petroleum HPV Testing Group (Jun. 17, 2004), Appendix A, pp. 38-42.
Periodic Table of the Elements as published in "Hawley's Condensed Chemical Dictionary" (2001) (the "CAS" system).
Barrett et al., "The Determination of Pore Volume and Area Distributions in Porous Substances. I. Computations from Nitrogen Isotherms," J. Am. Chem. Soc., 1951, 73 (1), p. 373.
Brunauer et al., "Adsorption of gases in multimolecular layers", Journal of American Chemical Society, 60, pp. 309-319 (1938).
ASTM D 3037-93 Standard Test Method for Distillation of Petroleum Products at Reduced Pressure, "Withdrawn Standard: ASTM D3037-93 Standard Test Methods for Carbon Black-Surface Area by Nitrogen Avsorption (Withdrawn 1999)", <http://astm.org/Standards/D3037.htm>, downloaded Sep. 13, 3013.
ASTM D4284-07, "A Standard Test Method for Determining Pore Volume Distribution of Catalysts by Mercury Intrusion Porosimetry", pp. 1-6, published Oct. 1992.
Drake et al., "Macropore-Size Distributions in Some Typical Porous Substances", Industrial and Engineering Chemistry, Analytical Edition 17, 787 (1945).
Periodic Table of the Elements, published by the International Union of Pure and Applied Chemistry (IUPAC), published on-line at http://old.iupac.org/reports/periodic_table/; version dated Feb. 19, 2010.
Van Kerkvoort, W. J. and Nieuwstad, A. J., "Determination of Dry-sludge content of fuel oils: Development of the shell hot filtration test (SHFT)", Journal of the Inst. of Petroleum (1951), 37, pp. 596-604.
ASTM D4870 Standard Test Method for Determination of Total Sediment in Residual Fuels, "Standard Test Method for D4870", downloaded Sep. 20, 2013.

(56) References Cited

OTHER PUBLICATIONS

ASTM D4530 Standard Test Method for Distillation of Petroleum Products at Reduced Pressure, "Historical Standard: STM D4530-00 Standard Test Method for Determination of Carbon Residue (Micro Method)", downloaded Sep. 20, 2013.
ASTM D1160-06 Standard Test Method for Distillation of Petroleum Products at Reduced Pressure, "Historical Standard: STM D1160-06 Standard Test Method for Distallation of Petroleum at Reduced Pressure", downloaded Sep. 20, 2013.

Example of Pore Size Distribution
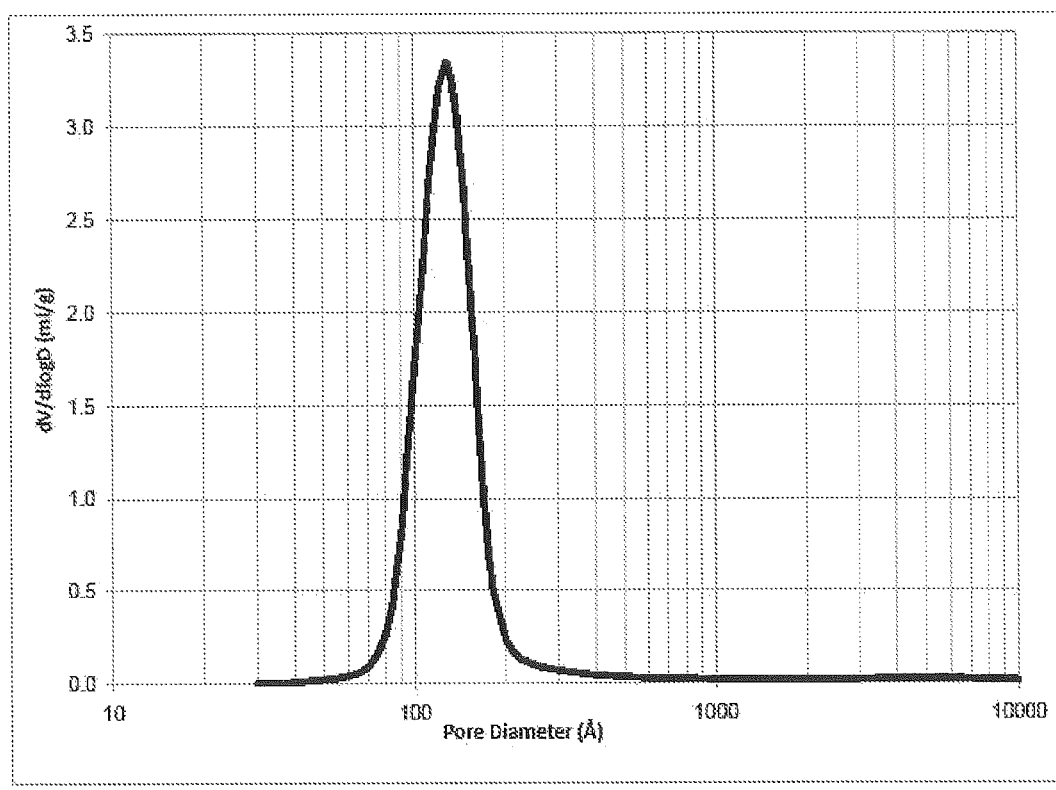

CATALYST SUPPORT AND CATALYSTS PREPARED THEREFROM

This application is a continuation of U.S. application Ser. No. 14/635,407 filed Mar. 2, 2015, which is a continuation of application Ser. No. 13/822,340, filed on May 3, 2013, which is a national phase entry under 35 U.S.C. § 371 of International Application No. PCT/US2012/049415 filed Aug. 3, 2012, published in English, which claims priority from U.S. Provisional Patent Application No. 61/530,108 filed Sep. 1, 2011, all of which are incorporated herein by reference.

BACKGROUND OF THE INVENTION

There is a continuing need in the petroleum industry for improved catalyst supports and supported catalysts derived therefrom, which have enhanced activity and improved catalyst life and exhibiting a desirable balance of morphological properties.

Foraminous carriers in particulate form have been found to be useful for example as catalyst supports and in preparing catalysts for chemical processes. Such applications include added catalytic materials, such as metallic ions, finely-divided metals, cations, and the like, to the carrier. The level and distribution of these metals on the support, as well as the properties of the support itself are representative parameters that influence the complex nature of catalytic activity and life.

For supported catalysts used in chemical reactions, the morphological properties of the support, such as surface area, pore volume, pore size and pore size distribution of the pores that comprise the total pore volume are very important. Such properties influence the nature and concentration of active catalytic sites, the diffusion of the reactants to the active catalyst site, the diffusion of products from the active sites and catalyst life. In addition, the support and its dimensions also influence the mechanical strength, density and reactor packing characteristics, all of which are important in commercial applications.

Hydroprocessing catalysts in petroleum refining represent a large segment of alumina-supported catalysts in commercial use and such hydroprocessing applications span a wide range of feed types and operating conditions, but have one or more common objectives, namely, removal of heteroatom impurities (such as components selected from the group consisting of sulfur-containing compounds, nitrogen-containing compounds, metal-containing compounds (sometimes referred to as sulfur, nitrogen and metals), asphaltenes, carbon residue, sediment precursors, and mixtures thereof), increasing the hydrogen to carbon (H/C) ratio in the products (thereby reducing aromatics, density and/or carbon residues), and cracking carbon bonds to reduce boiling range and average molecular weight.

As refiners increase the proportion of heavier, poorer quality crude oil in the feedstock to be processed, the need grows for processes to treat the fractions containing increasingly higher levels of metals, asphaltenes, and sulfur. It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life and metals present in such streams which deposit on hydroprocessing catalysts tend to poison or deactivate the catalyst. Moreover, asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst can become deactivated rapidly and thus be subject to premature replacement.

Various hydroconversion processes are effectively carried out using an ebullated bed (EB) system. In an EB, preheated hydrogen and resid feedstock enter the bottom of a reactor wherein the upward flow of resid with or without an liquid internal recycle suspend the catalyst particles in the liquid phase. In improved EB processes, part of the catalyst is continuously or intermittently removed in a series of cyclones and fresh catalyst is added to maintain activity. Approximately about 1 wt. % of the catalyst inventory is replaced each day in an ebullated bed system. Thus, the overall system activity is the weighted average activity of catalyst varying from fresh catalyst particles to old or substantially deactivated particles. More particularly, the use of a series of ebullated bed reactors containing a catalyst having improved effectiveness and activity maintenance in the desulfurization and demetallation of metal-containing heavy hydrocarbon streams are known.

In general, it has been desirable to design a hydroprocessing catalyst so that it exhibits the highest surface area in order to provide the maximum concentration of catalytic sites and activity. However, surface area and pore diameter are inversely related within practical limits. Consequently, a catalyst support, such as alumina particles, containing predominantly small pores will exhibit the highest surface area. In contrast, sufficiently large pores are required for diffusion of feedstock components, particularly as the catalyst ages and fouls, but larger pores have a lower surface area. More specifically, the catalyst formulator or designer as well as the process engineer is faced with competing considerations which often dictate a balance of morphological properties for supports as well as catalysts derived therefrom.

For example, it is recognized (see for example, U.S. Pat. No. 4,497,909) that while pores having a diameter below 60 Angstroms (Å), within the range of what is referred to therein as the micropore region, have the effect of increasing the number of active sites of certain silica/alumina hydrogenation catalysts, these very same sites are the first ones clogged by coke thereby causing a reduction in catalyst activity. Similarly, it is also accepted that when such catalysts have more than 10% of the total pore volume occupied by pores having a pore diameter greater than 600 Å, within the region referred to herein generally as the macropore region, the mechanical crush strength is lowered as is the catalyst activity. Finally, it is recognized, that for certain silica/alumina catalysts, that maximization of pores having a pore diameter between 150 Å and 600 Å, approximately within the region referred to therein as the mesopore region, is desirable for acceptable activity and catalyst life.

Thus, while increasing the surface area of the catalyst can increase the number of the active sites, such surface area increase naturally results in an increase of the proportion of pores in the micropore region and micropores are more easily clogged by coke. In short, increases in surface area and maximization of mesopore diameter are antagonistic properties. Moreover, not only must the surface area be high, but it should also remain stable when exposed to petroleum feedstock conversion conditions such as high temperature and moisture. There has therefore been a continuing search for stable carrier particles that exhibit a combination of pore size distribution and total surface area that can provide a combination of performance characteristics suitable for use as catalyst supports, particularly when used to support catalytically active metals for producing hydroprocessing catalysts.

It is further recognized that the physical and chemical properties of the carrier can depend on the procedures followed in its preparation and that many preparation processes have been developed in attempts to optimize its properties for use as a catalyst support material. Examples of suitable foraminous carrier materials are described hereinbelow. A carrier material such as alumina is frequently precipitated by combining a water-soluble, acidic aluminum compound which may be an aluminum salt such as aluminum sulfate, aluminum nitrate, or aluminum chloride, and an alkali metal aluminate such as sodium or potassium aluminate. (See for example, U.S. Pat. No. 4,154,812, Sanchez, M. G. and Laine, N. R., assigned to W. R. Grace & Co., which is incorporated herein to the extent permitted.) Thus, while catalyst carriers, including alumina carriers, are known, further improvements are needed in order to provide carriers having still further improved properties.

When used in ebullated bed resid hydrocracking processes, embodiments of the present invention increase 1000+° F. vacuum residuum (VR) or "resid" conversion and hydrodesulfurization (HDS) and hydrodemicrocarbon residue (HDMCR) or microcarbon reduction activity while maintaining catalyst sediment control functionality. Converting VR into lighter product occurs by thermocracking and catalytic hydrocracking at elevated temperature. Thus, suitable hydroprocessing catalysts are needed which provide suitable pore volume, surface area and pore size and distribution characteristics for maximizing catalytic hydrocracking reactions especially involving large molecules present in residuum. However, as discussed above, due to the nature of resid feedstock, catalysts gradually lose pore volume due to deposition of metals such as Ni and V present in the feedstock as well as deposition of coke that may form at elevated temperature, thus causing deterioration in hydrocracking activity of the catalyst with the progression of the reaction, and also increasing the formation of sediment.

Embodiments of the present invention include methods for preparing catalyst carriers as well as hydroprocessing, HDS, hydrodenitrification (HDN), hydrodemetallation (HDM) and HDMCR and other catalysts prepared using the carrier, and to processes for hydrodesulfurizing, hydrodenitrogenizing or hydrodemicrocarbonizing a hydrocarbon feedstock using the aforementioned catalyst. More particularly, embodiments also relate to a method for the preparing a porous catalyst carrier and catalyst using such carrier having preferred and defined pore characteristics, including pore size and pore size distribution, and containing at least one metal and/or metal compound of Groups 6 (also referred to as Group VIB) and Groups 8, 9 and 10 (also referred to as Group VIII) of the Periodic Table of the Elements.

In the course of conducting hydroprocessing reactions, unconverted or partially converted large feedstock molecules can aggregate and precipitate from whole liquid product and form sediment which is a highly undesirable hydroprocessing process by-product that can foul downstream equipment, such as heat exchangers, separators and fractionators. It would be desirable to develop catalysts exhibiting improved catalytic activity and/or stability, particularly in EB processes that do not negatively impact sediment formation, thus allowing refiners employing EB hydroconversion units to produce more and lighter petroleum products and with improved economics.

BRIEF SUMMARY OF THE INVENTION

One embodiment of the present invention comprises a supported catalyst comprising at least one metal from Group 6, alternatively referred to as Group VIB, of the Periodic Table of the Elements, at least one metal from Groups 8, 9 or 10, alternatively referred to as Group VIII, of the Periodic Table of the Elements, and optionally comprising phosphorous, wherein said metals, and phosphorous when present, are carried on a foraminous carrier or support, said carrier or support comprising having a total pore volume (TPV) of about 0.6 cc/g to about 1.1 cc/g and comprising: (a) equal to or greater than about 78% to about 95% of TPV in pores having a diameter of less than 200 Angstroms (Å); (b) greater than about 2% to less than about 19% of TPV in pores having a diameter of 200 Å to less than 1000 Å; and (c) equal to or greater than 3% to less than 12% of said TPV in pores having a diameter equal to or greater than 1000 Å.

Further embodiments comprise processes for treating hydrocarbon feedstocks to produce treated products, said processes selected from the group consisting of: (A) hydrodemetallation, hydrodenitrification, hydrodesulfurization, hydrocracking, said process comprising contacting said feedstock in at least one reactor with hydrogen under hydrocracking conditions with a catalyst and recovering said product; (B) hydrotreating said hydrocarbon feed containing components boiling above 1000° F., and components selected from the group consisting of sulfur-containing compounds, nitrogen-containing compounds, metal-containing compounds, asphaltenes, carbon residue, sediment precursors, and mixtures thereof, comprising contacting said feed with hydrogen and a catalyst at isothermal or substantially isothermal hydrotreating conditions and recovering said treated product; (C) hydroconverting said hydrocarbon feed having components exhibiting a boiling point greater than 1000° F. to form product having an increased proportion of components exhibiting a boiling point less than about 1000° F. comprising contacting said feed with hydrogen and a catalyst at isothermal or substantially isothermal hydrotreating conditions and recovering said product; and (D) hydroconverting said feed, comprising contacting said feed comprising a hydrocarbon oil with hydrogen and a catalyst under conditions of elevated temperature above about 600° F. and pressure above about 500 p.s.i.g. and recovering said product; said catalyst comprising at least one metal from Group 6, alternatively referred to as Group VIB, of the Periodic Table of the Elements, at least one metal from Groups 8, 9 or 10, alternatively referred to as Group VIII, of the Periodic Table of the Elements, and optionally comprising phosphorous, wherein said metals, and phosphorous when present, are carried on a foraminous carrier or support: said support comprising porous alumina having a total pore volume (TPV) of about 0.6 cc/g to about 1.1 cc/g and pore size distribution and contents corresponding to values as measured by the mercury porosimetry method: (1) equal to or greater than about 78% to about 95% of total pore volume (TPV) in pores having a diameter of less than 200 Angstroms (Å); (2) greater than about 2% to less than about 19% of TPV in pores having a diameter of 200 (Å) to less than 1000 Å; (3) equal to or greater than 3% to less than 12% of said pore volume in pores having a diameter equal to or greater than 1000 Å.

In a further embodiment the support exhibits a d50 greater than about 100 Å and less than about 150 Å.

BRIEF DESCRIPTION OF THE DRAWINGS

FIG. 1 illustrates the pore size distribution of a catalyst supported on an alumina carrier produced according to Example 9.

DETAILED DESCRIPTION

Definitions

As used herein the following terms or phrases have the indicated meanings.

The terms "catalysts" and "catalyst systems" are used interchangeably herein.

The term "about" when used as a modifier for, or in conjunction with, a variable, characteristic or condition is intended to convey that the numbers, ranges, characteristics and conditions disclosed herein are flexible and that practice of the present invention by those skilled in the art using temperatures, rates, times, concentrations, amounts, contents, properties such as size, including pore size, pore volume, surface area, etc., that are outside of the stated range or different from a single stated value, will achieve the desired result or results as described in the application, namely, preparation of porous foraminous catalyst carrier particles having defined characteristics and their use in preparing active catalysts and processes using such catalysts.

"Component" as applied to, for example, metals of the catalyst impregnating solution or catalyst per se refers to any compound or complex, including a salt, oxide, sulfide, or any intermediate form between oxide and sulfide of the metal in question.

"Comprise" or "comprising": Throughout the entire specification, including the claims, the word "comprise" and variations of the word, such as "comprising" and "comprises," as well as "have," "having," "includes," "include" and "including," and variations thereof, means that the named steps, elements, components or materials to which it refers are essential, but other steps, elements, components or materials may be added and still form a construct within the scope of the claim or disclosure. When recited in describing the invention and in a claim, it means that the invention and what is claimed is considered to be what follows and potentially more. These terms, particularly when applied to claims, are inclusive or open-ended and do not exclude additional, unrecited elements, components or methods steps.

"Feedstocks" or petroleum feedstocks typically treated using processes that include catalysts of the present invention are often described in terms of being "heavy" or "light". The terms "light" and "heavy" with regard to petroleum fractions are used herein in their normal sense within the refining industry to refer respectively to relatively low and high boiling point ranges. Heavy Fuel Oils (HFOs) include both finished products (residual fuels) and the primary refinery streams from which they are blended. Members of the heavy fuel oil category are a diverse group of substances encompassing hydrocarbons with a wide range of molecular weights, carbon numbers (typically about $C_7$ to about $C_{50}$) and boiling points (about 250° F. to about 1112° F. (about 121° C. to 600° C.). In addition to petroleum hydrocarbons they contain one or more heterocyclic compounds containing sulfur, nitrogen, and oxygen, and organo-metallic or metallic compounds. Finished heavy fuels (residual fuels) are products that comprise primarily the residuum of the refining process after virtually all of the higher-quality hydrocarbons have been distilled, cracked, or catalytically removed from crude oil feedstock. Substantially all (at least 90 vol. %) of hydrocarbon feed streams or feedstocks typically fall within the boiling point range between about 300° F. and 1050° F. and preferably between about 600° F. and 1000° F. A feedstock can comprise a mixture of petroleum fractions such as atmospheric and vacuum gas oils (AGO and VGO). Suitable feedstocks include heavy hydrocarbonaceous mineral or synthetic oil or a mixture of one or more fractions thereof. Thus, such known feedstocks as straight run gas oils, vacuum gas oils, demetallized oils, deasphalted vacuum residue, coker distillates, cat cracker distillates, shale oil, tar sand oil, coal liquids and the like are contemplated. A preferred feedstock will have a boiling point range starting at a temperature above about 260° C. (above about 500° F.). Hydrocracking feedstock may contain nitrogen, usually present as organonitrogen compounds in amounts between 1 ppm and 1.0 wt. %. The feedstock will normally also comprise sulfur-containing compounds sufficient to provide a sulfur content greater than 0.15 wt. %. The boiling point ranges of various product fractions recovered in any particular refinery will vary depending on such factors as the characteristics of the crude oil source, the refinery's local markets, product prices, etc. The American Petroleum Institute (API) has recommended to the EPA a list of generic names for refinery streams consistent with industry operations and covering all known processes used by refiners. The list, including generic names, CAS numbers and definition of each stream, was published by the EPA as "Addendum I, Generic Terms Covering Petroleum Refinery Process Streams." The definitions for these streams can also be found "High Production Volume (HPV) Chemical Challenge Program, Test Plan, Heavy Fuel Oils Category", Submitted to the US EPA, The Petroleum HPV Testing Group (Jun. 17, 2004), Appendix A, pages 38-42. Petroleum streams suitable for processing using the catalysts of the present invention are identified in the EPA document, the content of which is incorporated herein by reference, to the extent permitted.

"Group" or "Groups": Any reference to a Group or Groups of the Periodic Table of the Elements is preferably to the Group or Groups as reflected in the Periodic Table of Elements using the IUPAC system for numbering groups of elements as Groups 1-18. However, to the extent that a Group is identified by a Roman numeral according, for example, to the Periodic Table of the Elements as published in "Hawley's Condensed Chemical Dictionary" (2001) (the "CAS" system) it will further identify one or more Element of that Group so as to avoid confusion and provide a cross-reference to the numerical IUPAC identifier.

"Median pore diameter" (MPD) can be calculated, for example, based on volume, surface area or based on pore size distribution data. Median pore diameter calculated by volume means the pore diameter above which half of the total pore volume exists; median pore diameter calculated by surface area means that pore diameter above which half of the total pore surface area exists. And median pore diameter calculated based on pore size distribution means the pore diameter above which half of the pores have a larger diameter according to the pore size distribution determined as described elsewhere herein, for example, using mercury intrusion.

"Micropore" as used herein means pores present in catalysts or catalyst supports produced according to processes of the invention having a diameter of less than 200 Å.

"Mesopore" as used herein means pores present in catalysts or catalyst supports produced according to processes of the present invention having a diameter of 200 Å to less than 1000 Å.

"Macropore" as used herein means pores present in catalysts or catalyst supports produced according to processes of the present invention having a diameter equal to or greater than 1000 Å.

Each of the above definitions of micropore, mesopore and macropore are considered distinct such that there is no overlap and pores are not counted twice when summing up percentages or values in a distribution of pore sizes for any given sample.

"d50" means the median pore diameter as measured by mercury porosimetry. Thus it corresponds to the median pore diameter calculated based on pore size distribution and is the pore diameter above which half of the pores have a larger diameter. d50 values reported herein are based on nitrogen desorption using the well-known calculation method described by E. P. Barrett, L. G. Joyner and P. P. Halenda ("BJH"), "The Determination of Pore Volume and Area Distributions in Porous Substances. I. Computations from Nitrogen Isotherms," J. Am. Chem. Soc., 1951, 73 (1), pp 373-380.

"Pore mode" as used herein means the pore diameter corresponding to the peak maximum of the pore sized distribution (PSD) curve where the differential mercury intrusion volume, in cc/g, is plotted as a function of the log differential of the pore diameter (dV/dlogD).

"Total pore volume" as used herein means the cumulative volume in cc/g of all pores discernable by either nitrogen desorption or mercury penetration, also referred to as mercury intrusion (porosimetry) methods. For catalyst support or carrier particles and particularly for alumina powder, the pore diameter distribution and pore volume can be calculated with reference to nitrogen desorption isotherm (assuming cylindrical pores) by the B.E.T. (or BET) technique as described by S. Brunauer, P. Emmett, and E. Teller in the Journal of American Chemical Society, 60, pp 209-31.9 (1939); see also ASTM D 3037, which identifies the procedure for determining the surface area using the nitrogen BET method.

ASTM D4284-07, "A Standard Test Method for Determining Pore Volume Distribution of Catalysts by Mercury Intrusion Porosimetry" is an accepted test that is used to determine the volume distribution of pores in catalysts and catalyst carrier or support particles with respect to the apparent diameter of the entrances to pores. As discussed above, generally both the size and volume of pores in a catalyst affect its performance Thus, the pore volume distribution is useful in understanding catalyst performance and may be one of the characteristics specified for a catalyst that can be expected to perform in a desired manner The values for pore volume, including total pore volume or total intrusion volume, and various attributes of pore volume distribution, such as the percentage of pores in various size ranges, as well as pore mode, are based on the mercury intrusion method.

The pore diameter distribution can be calculated by means of the formula:

$$\text{pore diameter(in Angstroms)} = \frac{150{,}000}{\text{absolute mercury pressure(in bar)}}$$

and in accordance with the mercury penetration method (as described by H. L. Ritter and L. C. Drake in Industrial and Engineering Chemistry, Analytical Edition 17, 787 (1945)), using mercury pressures of 1-2000 bar. Mercury penetration is the technique of choice when the quantity of pores <60 Å in diameter is small as is the case, for example, in agglomerates.

The total $N_2$ pore volume of a sample is the sum of the nitrogen pore volumes as determined by the above described nitrogen desorption method. Similarly, the total mercury pore volume of a sample is the sum of the mercury pore volumes as determined by the mercury penetration method described above using, for example, a contact angle of 130°, a surface tension of 485 dynes/cm and a Hg density of 13.5335 gm/cc.

"Surface area" refers herein to the specific surface area determined by nitrogen adsorption using the BET technique as described above, whether in powder or agglomerate form.

All morphological properties involving weight, such as pore volume, PV (cc/g) or surface area, (SA) (m$^2$/g) can be normalized to a "metals free basis in accordance with procedures well-known in the art. However, the morphological properties reported herein are on an "as-measured" basis without correcting for metals content.

"Periodic Table": All references to the Periodic Table of the Elements herein refers to the Periodic Table of the Elements, published by the International Union of Pure and Applied Chemistry (IUPAC), published on-line at http://old.iupac.org/reports/periodic_table/; version dated 19 Feb. 2010.

"Substantially": Unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met. For example, see below for use of the term "substantially" in connection with a description of unimodal pore size distribution.

When used with reference to various processes for treating hydrocarbon feedstocks, the phrase "substantially isothermal" is typically understood to mean operation of the process is such that temperature may typically vary throughout the catalyst bed by less than about 50° F., preferably less than about 40° F., more preferably less than about 30° F., for example less than about 20° F., such as close to 0° F. and up to about 20° F. or 30° F. or 40° F. or as much as 50° F. In the alternative, operation of such a process may be referred to as operating isothermally even while exhibiting a temperature variation as described above.

Carriers or supports useful in the present invention are generally identified as "foraminous" carriers; for purposes of the present invention such carriers will be generally understood to comprise many holes, perforations and/or porosity. Examples of suitable foraminous carrier materials include silica, silica gel, silica-alumina, alumina, titania, titania-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clays, synthetic clays, cationic clays or anionic clays such as saponite, bentonite, kaolin, sepiolite or hydrotalcite, and mixtures thereof. Preferred foraminous carrier materials are silica, silica-alumina, alumina, titania, titania-alumina, zirconia, bentonite, boria, and mixtures thereof; silica, silica-alumina, and alumina are especially preferred. Alumina for use as a carrier can be prepared, for example, by converting an alumina precursor in pseudoboehmite form, into a preferred form for use as a carrier material, gamma-alumina, typically using calcination.

Alumina Powder Preparation

In carrying out embodiments of the present invention, alumina compositions are typically prepared in a batch process in which the alumina is precipitated under controlled reactant concentrations and reaction conditions, including temperature, time, pH, reactant feed rates and the like. Such processes are generally known in the art (see, for example, U.S. Pat. No. 4,154,812, Sanchez et al., U.S. Pat. No. 6,403,526, Lussier et al., and the patents cited therein, the disclosures of which are incorporated herein by reference); relevant alumina preparative methods are disclosed herein.

In a preferred embodiment for preparing alumina, filter cake produced in the course of the synthesis is dried to produce a powder of alumina which can be conveniently stored without degrading for long periods of time prior to use in further processing. Drying of the filter cake may be done by several methods, such as tray drying, belt drying, spray drying, combinations of these and the like. Drying conditions are typically adjusted to effect the partial removal of water, for example to a level of about 20 wt. % to about 35 wt. % volatiles, preferably about 22 wt. % to about 30 wt. %, for example, about 23, 24, 25, 26, 27, 28, or 29 wt. % volatiles.

Dried alumina powder or washed alumina filter cake, or both, and water are mixed or commingled to provide what is referred to as a damp or wet mix or a dough. Optionally, an acidic or basic aqueous medium, such as an aqueous solution of an acid or acid salt, can also be added to the mixture. When an acid is included, preferably an aqueous solution of a monobasic mineral acid is commingled with water and the alumina to provide the mix. Hydrochloric acid and other strong monobasic acids, including nitric acid may be used; nitric acid is preferred. Other useful acids include organic acids such as acetic acid, formic acid, propionic acid and the like. Alternatively, an aqueous base such as ammonium hydroxide can be used. In addition, as disclosed in the art, recycled, calcined product fines in an amount of up to about 25 percent by weight of total alumina may advantageously be added during this step.

The mixture resulting from the previous step is referred to as a damp mix. This mix is formed into the carrier, such as in the form of pills or other shapes, as described elsewhere herein. This step is conveniently conducted by extruding the damp mix, which is typically followed by drying and calcination of the pills.

Calcination may be done batchwise or continuously by contacting the shaped alumina carrier product with hot gases which may be either indirectly heated gases or the combustion products of ordinary fuels with air. Regardless of the particular method used, the product is typically calcined at temperatures of about 1000° F. to about 2000° F., alternatively at about 1200° F. to about 1900° F., such as about 1400° F. to about 1800° F., for periods of from about 30 minutes to about 3 hours, preferably about 30 minutes to about 2 hours.

Another property that can be used to indicate whether or not a suitable powder is obtained is referred to as the "dispersibility index" (DPI). The test method used to obtain DPI values reported herein is described as follows:

A sample of alumina powder (8 g dry basis) is mixed with 99 mL of an aqueous 0.078 N nitric acid solution for 5 min in a blender. The resulting slurry is analyzed with a Micromeritics Sedigraph® III instrument (Micromeritics Instrument Corporation, Norcross, Ga.). The cumulative mass percent of particles under 1 micron is calculated by the instrument and reported as DPI. An alternative method of the test is described, for example in U.S. Pat. No. 6,919,294, starting in col. 4, line 45 and is based on the amount of powder that remains suspended versus the amount that is separated from the slurry by use of a centrifuge.

For purposes of the present invention useful DPI values are greater than about 40%; for example about 40% to equal to or less than about 100%; such as about 40% to about 90%; for example, about 45% to about 85%.

Alumina Support Properties

As described above, the powder is subsequently mixed with water and optionally with recycled fines and an acid such as nitric acid and extruded to produce support particles such as in the form of pills, which are then dried and preferably calcined. In the description that follows, the product produced at this stage of the process is referred to as "alumina support particles", catalyst support particles or "catalyst carrier particles" or simply "support" or "carrier" particles.

Several properties of the alumina support particles produced according to the synthesis methods described above are typically determined and generally characterize the particles. Various properties and test methods are defined hereinabove and also referred to in the Examples below. Typical values for several of the properties are summarized as follows.

The total mercury pore volume of a sample is the sum of the mercury pore volumes as determined by the mercury penetration method described above.

Alumina support or carrier particles of the present invention have a total pore volume (sometimes referred to a total intrusion volume, TIV, or total mercury pore volume, which refers to measurements made using the mercury intrusion method) in cc/g, of typically about 0.6 to about 1.1 cc/g; preferably about 0.75 to about 0.95, preferably about 0.78 to about 0.93, for example about 0.78 to about 0.85 cc/g.

Alumina support or carrier particles produced in accordance with the present invention have a total nitrogen surface area in $m^2/g$, of typically at least about 185, preferably at least about 195 and most preferably at least about 205 $m^2/g$. In each instance, typical support or carrier particles can exhibit a total nitrogen surface area of about 275 $m^2/g$.

The content of macropores of the carrier particles, namely pore sizes equal to or greater than 1000 Å measured using the mercury penetration method, will be typically equal to or greater than 3% to less than or equal to 12%; preferably equal to or greater than 3% to less than or equal to about 10% and most preferably equal to or greater than 3% to less than or equal to about 8% of the total pore volume. For example, in each of the expressed ranges, amounts "greater than" 3% can be 3.1%, 3.2%, 3.3%, etc. expressed in tenths of a percent and including 4%, 5%, 6%, 7% and so on.

The content of nitrogen mesopores of the carrier particles, namely pores having diameters of 200 Å to less than 1000 Å measured using the mercury penetration method, will range typically from greater than about 2% to less than about 19%; preferably from about 2% to less than about 15%; and more preferably from about 3% to about 10% of the total pore volume.

The micropore content of the carrier particles measured using the mercury penetration method, namely carrier particles exhibiting pores having diameters of less than 200 Å, will be typically greater than about 78%, preferably greater than about 80% and most preferably greater than about 85% of the total pore volume, which micropore content can range typically from greater than about 78% to about 95%, and including individual values and alternative ranges within this range.

The carrier or support particles are further characterized in that they exhibit a pore mode (also measured using the mercury penetration method) typically equal to or greater than about 90 Å and less than about 160 Å, preferably greater than about 100 Å and less than about 150 Å, more preferably about 110 Å and less than about 140 Å.

Typically, catalyst carrier or support particles prepared according to the present invention exhibit a substantially monomodal or unimodal pore size distribution (PSD) with the major peak corresponding to the pore mode of the distribution. For purposes of the present invention substantially unimodal means that the particles comprising a carrier or support exhibit substantially a single peak in a plot of volume of pores versus pore diameter (in Å). Such a distribution allows for one or more additional peaks at greater than about 200 Å provided that if such additional peak is present the total volume of pores comprised in such additional peak is greater than zero to about 10, 9, 8, 7, 6, 5, 4, 3, 2, 1, 0.8, 0.6, 0.4, 0.2, 0.1, 0.08, 0.06, 0.04, 0.02, or 0.01% of the total pore volume present in the carrier or support. Preferably, only a single discernible peak is present in the distribution. Alternatively, a second peak may be present in an amount of greater than zero to about 5% of the total pore volume present.

The carrier or support particles are further characterized in that they exhibit a d50 (also measured using the mercury penetration method) typically greater than about 100 Å and less than about 150 Å, preferably greater than about 110 Å and less than about 140 Å, more preferably about 115 Å and less than about 135 Å.

A typical pore size distribution of a catalyst supported on a carrier prepared according to the present invention is illustrated in FIG. 1. It will be observed that the pore mode of this sample is between 100 Å and 200 Å, specifically at about 130 Å.

Support particles can also typically be subjected to a thermal activation treatment (also referred to as calcination) at a temperature, in ° C., in the range of typically from about 450 to about 1100, preferably from about 550 to about 1000, and most preferably from about 600 to about 900° C. for periods of time in hours of typically from about 0.2 to about 3, preferably from about 0.3 to about 2, and most preferably from about 0.5 to about 1.5 hours. The atmosphere in which activation is conducted is typically air, but can include inert gases such as nitrogen.

Catalyst Preparation

Generally, hydroprocessing catalysts, especially ebullated bed hydroprocessing catalysts, can be produced using alternative methods. In one method, alumina powder is mixed with water and then extruded to form a pelleted catalyst support. The support is dried and calcined, and Mo metal and Ni metal precursors are impregnated onto the support. The impregnated wet pellets are then dried and calcined to provide finished products. In another preparation method, alumina and catalytic metal precursors, water, and additives such as extrusion aids, peptizing chemicals, and the like, are co-mixed and extruded into pellets. The metal-containing wet pellets are then dried and calcined to produce the final catalyst.

Suitable catalysts can be prepared by impregnating a catalyst carrier, preferably an alumina carrier exhibiting the properties described herein, using stabilized aqueous compositions and methods as described in U.S. Pat. Nos. 7,390,766, 7,560,407 and 7, 642,212 (D. P. Klein, assigned to Advanced Refining Technologies), the disclosure of which is incorporated herein to the extent permitted. A suitable method and composition comprises adding to a suitable quantity of water: (A) at least one substantially water insoluble Group 8, 9 or 10 metal component; and (B) at least one substantially water-soluble, phosphorous-containing acidic component in an amount insufficient to cause dissolution of the at least one Group 8, 9 or 10 metal component, so as to produce a slurry typically at ambient temperature, and combining the slurry with: (C) at least one Group 6 metal component; and (D) mixing the combination of (A), (B) and (C) and heating the mixture, for a time and to a temperature sufficient for (A), (B) and (C) to form a solution; and (E) adding an additional amount of water, if required, to obtain solution concentrations of at least one Group 8, 9 or 10 metal, the at least one Group 6 metal and phosphorous useful for impregnating the carriers; wherein Group 6 and Group 8, 9 and 10 refer to Groups of the periodic table of the elements. In various preferred embodiments: the molar ratio of the at least one Group 8, 9 or 10 metal to Group 6 metal is about 0.05 to about 0.45, provided that the amount of the at least one Group 8, 9 or 10 metal is sufficient to promote the catalytic effect of the Group 6 metal; the concentration of the Group 6 metal, expressed as the oxide, is at least about 3 to about 50 weight percent based on the weight of the composition; and the amount of phosphorous-containing acidic component is sufficient to provide a phosphorous to Group 6 metal molar ratio of about 0.05 to less than about 0.25. In a still further embodiment, the process includes the step of separating the volatile portion of the solution from the impregnated uncalcined carrier to obtain a dried catalyst having a desired moisture content.

"Pre-impregnated" catalyst refers to a catalyst in which the metals-containing solution or solutions are added before the foraminous catalyst carrier is calcined. The metals-containing solution or solutions can be added prior to or after shaping of the catalyst particle, but the important aspect is that the metals-containing solution or solutions be added prior to the carrier material being calcined. However there are significant advantages to be gained by shaping of the uncalcined carrier after impregnation (contact) with an aqueous solution containing one or more catalytic metals. These advantages are observed in the form of more desirable distribution of the metals throughout the carrier in the final catalyst. Thus, a "pre-impregnated" catalyst can be made as follows:

Uncalcined pseudoboehmite alumina powder is thoroughly mixed with water, or optionally with a dilute aqueous solution of nitric acid, and the mixture is combined with a suitable quantity of a stable metals solution. Such solution typically contains molybdenum, nickel and phosphorus, plus an optional additional quantity of metals solution of one or more metals of Group 8, 9 and 10, if required in order to provide the desired amount of metals on the finished catalyst. Note that the one or more metals of Group 8, 9 and 10, employed to achieve the optional additional quantity of the one or more metals of Group 8, 9 and 10, is typically selected to be water-soluble under the temperature conditions encountered.

The metal-containing mixture, typically containing about 50 to about 65 weight percent moisture, is shaped into catalyst particles having a desired size, preferably by extrusion. The formed catalyst particles are dried at a temperature of about 110 to about 150° C., and then calcined at a temperature of about 500 to about 750° C. for about one to about two hours.

"Post-impregnated" catalyst refers to a catalyst in which the metals-containing solution or solutions are added after the foraminous catalyst carrier is calcined. The foraminous catalyst carrier can be calcined before or after shaping of the catalyst particle, but the important aspect is that the metals-containing solution or solutions be added after the carrier material is calcined. Thus, a "post-impregnated" catalyst can be made as follows:

Uncalcined pseudoboehmite alumina powder is thoroughly mixed with water, or optionally with a dilute aqueous solution of nitric acid, and the alumina mixture, containing about 50 to 65 weight percent moisture, is then formed into catalyst particles having a desired size and shape, preferably by extrusion. The formed particles are dried at a temperature of about 110 to about 150° C., and then calcined at a temperature of about 400 to about 750° C. for about one to two hours. The dried and calcined particles are contacted with a suitable quantity of a stable metals solution. For example, such solution typically contains molybdenum, nickel and phosphorus, plus an optional additional quantity of solution of one or more metals of Groups 8, 9 and 10 (also identified as Group VIII according to the CAS designation), if required, in order to provide the desired amount of metals on the finished catalyst, while substantially and uniformly filling the pores. After a suitable contact time, the formed catalyst particles are dried at a temperature of about 110 to about 150° C., and then calcined at a temperature of about 400 to about 750° C. for about one to about two hours.

It will be observed that a significant distinction between a pre-impregnated catalyst and a post-impregnated catalyst is that the post-impregnated catalyst undergoes two calcining steps; typically one consisting essentially of the foraminous carrier and the second in which the carrier has been "loaded" with the catalytically active metal components including the phosphorous component. In contrast, the pre-impregnated catalyst undergoes one calcining step, as described.

Suitable catalytically active elements or metals from Groups 8, 9 and 10 present in components of the invention may include Fe, Co, Ni, Pd, Pt and the like and mixtures thereof. Of these, the most preferable are Co and Ni. Suitable Group VIB elements or metals include Cr, Mo, W, and mixtures thereof; most preferred are Mo and W. Preferred combinations of metal components comprise e.g., nickel and molybdenum, cobalt and molybdenum, tungsten and nickel or cobalt, molybdenum and a combination of cobalt and nickel, tungsten and a combination of nickel and cobalt, a combination of molybdenum and chromium and nickel, etc; the combination of molybdenum and nickel is particularly preferred.

A suitable overall process for preparing a stable impregnating solution can be described as follows:

Basic nickel- and molybdenum-containing solutions can be prepared by combining water, a molybdenum source, a nickel source and aqueous ammonia in appropriate ratios. A variety of molybdenum and nickel sources may be used. For molybdenum, these include but are not limited to: molybdenum trioxide, ammonium dimolybdate, and ammonium heptamolybdate. For nickel, these include but are not limited to nickel carbonate and nickel nitrate. The component weights can be varied to ensure solution stability, as well as the proper concentration and ratio of metals. Component weights, order of addition, temperature and reaction times required are well-known to those skilled in the art.

The catalyst composition typically comprises about 5 to about 35 wt. % of the total of Group 6 and Group 8, 9 or 10 or mixtures thereof metal components, calculated as oxides based on the total weight of the catalyst composition; preferably, about 8 to about 30 wt. %, more preferably about 10 to about 25 wt. %. The amount of Group VIB metals and Group VIII metals can be determined using atomic absorption spectrometry (AAS), inductively-coupled plasmaspectrometer (ICP) analysis and/or x-ray fluorescence (XRF).

The supported catalyst composition following impregnation, drying and calcinations, i.e., wherein the metal components and phosphorus are present as oxides, and, preferably, prior to a sulfidation step, if any, exhibit the same or substantially the same properties described above. In other words, properties such as pore mode, d50 and percent of pore volume in various ranges described above, are typically substantially the same in the supported catalyst as in the support. Properties such as total pore volume or total intrusion volume and surface area, which are expressed on a unit weight basis will typically be substantially the same provided that the values of the catalyst are expressed on a "metals-free basis" in order to account for the weight of the metals that are present. In these instances, "substantially the same" is understood to mean that the values are within about 15% of one another; for example within about 10%; including within about 5% of one another.

The term "agglomerate" refers to a product that combines particles that are held together by a variety of physical-chemical forces and the term "shaping" and grammatical variations thereof refers to the act of forming agglomerates. More specifically, each agglomerate is composed of a plurality of contiguous, constituent primary foraminous carrier particles, preferably joined and connected at their points of contact. Thus, the agglomerates particles typically exhibit a higher macropore content than the constituent primary particles from which they are made because of the interparticle voids between the constituent composite particles. These larger voids are not included as part of the characterizing properties of the primary foraminous carrier particles, for example, specific pore sizes or ranges and pore size distribution characteristics.

Agglomeration of the foraminous carrier, e.g., alumina, composite is carried out in accordance with methods well known to the art, and, in particular, by such methods as pelletizing, extrusion, shaping into beads in a rotating coating drum, and the like. The modulizing technique whereby composite particles having a diameter of not greater than about 0.1 mm are agglomerated to particles with a diameter of at least about 0.8 mm by means of a granulation liquid may also be employed. As is known to those skilled in the art, agglomeration may optionally be carried out in the presence of additional amorphous or crystalline binders, and pore-forming agents may be added to the mixture to be agglomerated. Conventional binders include other forms of alumina, silica, silica-alumina, clays, zirconia, silica-zirconia, magnesia and silica-boria. Conventional pore-forming agents which can be used in particular, include wood flour, wood charcoal, cellulose, starches, naphthalene and, in general, all organic compounds capable of being removed by calcination. The addition of pore forming agents, however, is not necessary or desirable.

The catalyst composition may have different shapes selected for their suitability for the process and/or equipment in which they are to be used. For example, if the catalyst composition is to be used in slurry-type reactors, fluidized beds, moving beds, or expanded beds, generally spray-drying or beading is applied. For fixed bed or ebullating bed applications, generally the catalyst composition is extruded, pelletized and/or beaded. In the latter case, at any stage prior to or during the shaping step, any additives, which are conventionally used to facilitate shaping, can be added. These additives may comprise aluminum stearate, surfactants, graphite, starch, methyl cellulose, bentonite, polyethylene glycols, polyethylene oxides or mixtures thereof. Further, as discussed elsewhere, when alumina is used as the carrier, nitric acid is sometimes added prior to the shaping step for the purpose of, e.g., increasing the mechanical strength of the agglomerates. In the present invention the shaping step is carried out in the presence of water. For extrusion and beading, the amount of water in the shaping mixture, expressed as LOI, preferably is in the range of 20-80%. If required by the shaping operation, additional water can be added or, if the amount of water is too high, it can be reduced by, e.g., solid-liquid separation via, e.g., filtration, decantation, or evaporation. It is within the scope of the skilled person to control the amount of water appropriately.

Suitable shapes include powders, spheres, cylinders, rings, and symmetric or asymmetric polylobal forms, for instance tri- and quadrilobal. Particles resulting from extrusion, beading or pelleting usually have a diameter in the range of about 0.2 to about 10 mm, and lengths in the range of about 0.5 to about 20 mm, but deviations from these general ranges are possible. Catalysts in the form of extrudates are generally preferred.

The present invention is also directed to catalyst compositions according to the invention wherein the metal components have been converted partly or wholly into their sulfides. In that case, it is preferred for the catalyst to be essentially free from Group VIII metal disulfides.

Calcination is generally carried out at a temperature typically about 200 to about 850° C.; preferably about 350 to about 800° C.; more preferably about 450 to about 750° C. The calcination time generally varies from about 0.5 to about 48 hours. Calcination temperatures for metals-containing (especially post-impregnated) supports or carriers are typically lower than those used for a support or carrier per se. The calcination may be carried out in an inert gas such as nitrogen, or in an oxygen-containing gas, such as air or pure oxygen, and optionally in the presence of steam. Preferably, the calcination is carried out in an oxygen-containing atmosphere.

Catalysts prepared by the methods described herein typically also exhibit a loss on ignition (LOI), measured at either 1000° F. or 1200° F. typically less than about 5 wt. %; preferably less than about 3 wt. %; more preferably less than about 2 wt. %.

Additionally, the physical characteristics of the finished catalyst can include the following properties, which are expected to be substantially the same as the alumina carrier particle from which the catalyst is made, each of these properties having been described above, namely surface area (SA), total intrusion volume (TIV) and pore mode. As noted above, SA and TIV should be expressed on a "metals free basis" for substantial similarity to apply.

Furthermore, catalysts according to the invention are particularly useful in hydrocarbon conversion processes comprising contacting a hydrocarbon feedstock with a particulate catalyst under conditions of elevated temperature and elevated pressure with hydrogen, wherein the catalyst is made according to the present invention. As generally described, such catalysts comprise at least one catalytically active metal from Group 6 of the periodic table, at least one catalytically active metal from Group 8, 9 and 10 of the periodic table, and optionally phosphorous, wherein the metals and optionally phosphorous are carried on the preferred alumina carrier described above and the pore mode and other particle properties are also as described.

Use of the Catalysts in Hydroprocessing Processes

Catalysts prepared according to the present invention can be used in virtually all hydroprocessing processes to treat a plurality of feeds under wide-ranging reaction conditions, generally, for example, at temperatures in the range of about 200° to about 500° C., hydrogen pressures in the range of about 5 to 300 bar, and liquid hourly space velocities (LHSV) in the range of about 0.05 to 10 $h^{-1}$. The term "hydroprocessing" can encompass various processes in which a hydrocarbon feed is reacted with hydrogen at elevated temperature and elevated pressure (hydroprocessing reaction conditions), including hydrogenation, hydrodesulfurization, hydrodenitrogenation, hydrodemetallization, hydrodearomatization, hydrocracking, and hydrocracking under mild pressure conditions, which is also referred to as mild hydrocracking.

More specifically, "hydroprocessing" as the term is employed herein means oil refinery processes for reacting petroleum feedstocks (complex mixtures of hydrocarbon present in petroleum) with hydrogen under pressure in the presence of a catalyst to lower: (a) the concentration of at least one of sulfur, contaminant metals, nitrogen, and Conradson carbon, present in said feedstock, and (b) at least one of the viscosity, pour point, and density of the feedstock. Hydroprocessing includes hydrocracking, isomerization/dewaxing, hydrofinishing, and hydrotreating processes which differ by the amount of hydrogen reacted and the nature of the petroleum feedstock treated.

Hydrofinishing is typically understood to involve the hydroprocessing of hydrocarbonaceous oil containing predominantly (by weight of) hydrocarbonaceous compounds in the lubricating oil boiling range ("feedstock") wherein the feedstock is contacted with solid supported catalyst at conditions of elevated pressure and temperature for the purpose of saturating aromatic and olefinic compounds and removing nitrogen, sulfur, and oxygen compounds present within the feedstock, and to improve the color, odor, thermal, oxidation, and UV stability, properties of the feedstock.

Hydrocracking is typically understood to involve the hydroprocessing of predominantly hydrocarbonaceous compounds containing at least five (5) carbon atoms per molecule ("feedstock") which is conducted: (a) at superatmospheric hydrogen partial pressure; (b) at temperatures typically below 593.3° C. (1100° F.); (c) with an overall net chemical consumption of hydrogen; and (d) in the presence of a solid supported catalyst containing at least one (1) hydrogenation component.

Hydrotreating is typically understood to involve the hydroprocessing of predominantly hydrocarbonaceous compounds containing at least five carbon atoms per molecule ("feedstock") for the desulfurization and/or denitrification of said feedstock, wherein the process is conducted: (a) at superatmospheric hydrogen partial pressure; (b) at temperatures typically below 593.3° C. (1100° F.); (c) with an overall net chemical consumption of hydrogen; and (d) in the presence of a solid supported catalyst containing at least one hydrogenation component.

A further embodiment of the present invention is directed to a process for the hydrotreating of a hydrocarbon feedstock in at least one ebullated bed reaction zone. More particularly, the hydrocarbon feedstock is contacted with hydrogen in one or a series of ebullated bed reaction zones in the presence of a hydroprocessing catalyst comprising a catalyst as described herein.

As is well known these feedstocks contain nickel, vanadium, and asphaltenes, e.g., about 40 ppm up to more than 1,000 ppm for the combined total amount of nickel and vanadium and up to about 25 wt. % asphaltenes. Further, the economics of these processes desirably produce lighter products as well as a demetallized residual by-product. This process is particularly useful in treating feedstocks with a substantial amount of metals containing 150 ppm or more of nickel and vanadium and having a sulfur content in the range of about 1 wt. % to about 10 wt. %. Typical feedstocks that can be treated satisfactorily by the process of the present invention contain a substantial amount (e.g., about 90%) of components that boil appreciably above 537.8° C. (1,000° F.). Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

While metallic contaminants, such as vanadium, nickel, and iron, are often present in various hydrocarbon streams, other metals are also present in a particular hydrocarbon stream. Such metals exist as the oxides or sulfides of the particular metal, or as a soluble salt of the particular metal, or as high molecular weight organometallic compounds, including metal naphthenates and metal porphyrins, and derivatives thereof.

Another characteristic phenomenon of hydrotreating heavy hydrocarbons is the precipitation of insoluble carbonaceous substances or sediment from the asphaltenic fraction of the feedstock which cause operability problems. Sediment can deposit on and inside various pieces of equipment downstream of the hydroprocessing unit and interferes with proper functioning of pumps, heat exchangers, fractionating towers, etc. Production of excessive amounts of sediment is undesirable in that deposition in downstream units typically requires shut-down of equipment to remove the sediment. The amount of such sediment or insolubles formed increases with the amount of material boiling over 537.8° C. (1,000° F.) which is converted or with an increase in the reaction temperature employed. These insoluble substances, also known as Shell hot filtration solids, create the operability difficulties for the hydroconversion unit and thereby circumscribe the temperatures and feeds the unit can andle. In other words, the amount of solids formed limit the conversion of a given feedstock. Operability difficulties as described above may begin to manifest themselves at solids levels as low as 0.1 wt. %. Levels below 0.5 wt. % are generally desired to prevent fouling of process equipment. A description of the Shell hot filtration test is found at A. J. J., Journal of the Inst. of Petroleum (1951) 37, pp. 596-604 by Van Kerkvoort, W. J. and Nieuwstad, A. J. J. which is incorporated herein by reference. Another useful test method for the determination of total sediment is described in ASTM D 4870-92.

Hydrotreating operations are typically carried out in one or a series of ebullated bed reactors. As previously elucidated, an ebullated bed is one in which the solid catalyst particles are kept in random motion by the upward flow of liquid and gas. An ebullated bed typically has a gross volume of at least 10 percent greater and up to 70% greater than the solids thereof in a settled state. The required ebullation of the catalyst particles is maintained by introducing the liquid feed, inclusive of recycle if any, to the reaction zone at linear velocities ranging from about 0.02 to about 0.4 feet per second and preferably, from about 0.05 to about 0.20 feet per second.

The operating conditions for the hydrotreating of heavy hydrocarbon streams, such as petroleum hydrocarbon residua and the like, are well known in the art and comprise a pressure within the range of about 1,000 psia (68 atm) to about 3,000 psia (204 atm), an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 $m^3/m^3$) to about 15,000 SCFB (2,671 $m^3/m^3$). Preferably, the operating conditions comprise a total pressure within the range of about 1,200 psia to about 2,000 psia (81-136 atm); an average catalyst bed temperature within the range of about 730° F. (387° C.) to about 820° F. (437° C.); and a LHSV within the range of about 0.1 to about 4.0; and a hydrogen recycle rate or hydrogen addition rate within the range of about 5,000 SCFB (890 $m^3/m^3$) to about 10,000 SCFB (1,781 $m^3/m^3$). Generally, the process temperatures and space velocities are selected so that at least 30 vol. % of the feed fraction boiling above 1,000° F. is converted to a product boiling below 1,000° F., more preferably at least 50 vol. % is converted to a product boiling below 1,000° F., and still more preferably so that at least 70 vol. % of the subject fraction is converted to a product boiling below 1,000° F.

For the treatment of hydrocarbon distillates, the operating conditions would typically comprise a hydrogen partial pressure within the range of about 200 psia (13 atm) to about 3,000 psia (204 atm); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 $m^3/m^3$) to about 10,000 SCFB (1,381 $m^3/m^3$). Preferred operating conditions for the hydrotreating of hydrocarbon distillates comprise a hydrogen partial pressure within the range of about 200 psia (13 atm) to about 1,200 psia (81 atm); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 $m^3/m^3$) to about 6,000 SCFB (1,068 $m^3/m^3$).

The most desirable conditions for conversion of a specific feed to a predetermined product, however, can be best obtained by converting the feed at several different temperatures, pressures, space velocities and hydrogen addition rates, correlating the effect of each of these variables and selecting the best compromise of overall conversion and selectivity. The catalyst composition of the invention is particularly suitable for hydrotreating heavy hydrocarbon feedstocks.

All parts and percentages in the examples, as well as in the remainder of the specification, are by weight unless otherwise specified.

EXAMPLES

In each of the following examples, precipitated alumina powders are pseudoboehmite.

Example 1

Alumina Powder No. 1

A strike tank (vessel) was filled with water (7700 gal) and heated to 123° F. Then aluminum sulfate (15.4 gpm of 8.2% $Al_2O_3$ solution) and sodium aluminate (9.8 gpm on average of 25% $Al_2O_3$ solution) were added to the strike tank. The aluminum sulfate was introduced at a fixed rate of 15.4 gallons per minute (gpm) but the sodium aluminate flow rate was adjusted to maintain a solution pH of 9.1 during the strike. The flow rates of sodium aluminate and aluminum sulfate were continued for 60 minutes, maintaining the pH and temperature of the strike solution or mixture, in other words the contents of the strike tank, at 9.1 and 123° F., respectively. During this time, alumina powder precipitated in the strike tank resulting in an alumina slurry. After 60 minutes the flow of each of the reactants was stopped and the slurry was pumped to a belt filter where the resulting powder was washed and filtered on a cloth belt. The resulting filter cake was fed to a spray dryer and dried to 27% total volatiles. The dried powder was collected and used for catalyst synthesis. Properties of the powder are summarized in Table 1, below.

Example 2

Alumina Powder No. 2

A strike tank was filled with water (4217 gal) and heated to 125° F. Then aluminum sulfate (9.2 gpm of 8.2% $A_2O_3$ solution) diluted with water (22.1 gpm) and sodium aluminate (6.8 gpm at an average of 25% $A_2O_3$ solution) diluted with water (35.3 gpm) were added to the strike tank. The aluminum sulfate was introduced at a fixed flow rate (9.2 gpm), but the sodium aluminate flow rate was varied to maintain a solution pH of 9.1 during the strike. The flow rates of sodium aluminate and aluminum sulfate were continued for 60 minutes maintaining the strike solution pH and temperature at 9.1 and 123° F., respectively. During this time, alumina powder precipitated in the strike tank resulting in an alumina slurry. After 60 minutes the flow of each reactant was stopped and the slurry was pumped to a belt filter where the resulting powder was washed and filtered on a cloth belt. The resulting filter cake was then fed to a spray dryer and dried to 25% total volatiles. The dried powder was collected and used for catalyst synthesis. Properties of the powder are summarized in Table 1, below.

Example 3

Alumina Powder No. 3

The alumina powder of this example is a commercially produced pseudoboehmite. It is similar to powders disclosed in U.S. Pat. No. 4,154,812. Properties of the powder are summarized in Table 1, below.

TABLE 1

Properties of Alumina Powders

| Powder of Example No. | 1 | 2 | 3 |
|---|---|---|---|
| Property | | | |
| $Al_2O_3$, wt. % | >98 | >99 | >98 |
| $Na_2O$, wt. % | 0.06 | 0.04 | 0.03 |
| $SO_4$, wt. % | 1.2 | 0.4 | 0.7 |
| Total Volatiles, wt. % | 26.1 | 24.0 | 29.8 |
| DPI (%) | 66 | 48 | 29 |
| Average Particle Size, μm | 29.2 | — | — |
| Surface Area, $m^2/g$ | 369 | 351 | 347 |
| Total Pore Volume, cc/g | 1.27 | 1.27 | 1.01 |

Surface area and total pore volume were determined using nitrogen and the BET method described earlier.

Higher values of total pore volume are preferred, as in powders 1 and 2 above; ultimately, properties of the support and supported catalyst are determinative of acceptable products. Furthermore, as described above, higher values of DPI are preferred, typically about 40% and higher.

Preparation of Supported Catalysts

Generally, catalyst metal impregnating solutions are prepared as follows:

Nickel and molybdenum containing solutions are created by combining water, a molybdenum source, a nickel source and aqueous ammonia in appropriate ratios. As described above, various molybdenum and nickel sources may be used including, but not limited to: molybdenum trioxide, ammonium dimolybdate, ammonium heptamolybdate, nickel carbonate and nickel nitrate. The solutions are then used to impregnate a calcined alumina support in order to prepare the finished catalyst. The component weights and order of addition are selected to ensure solution stability and the proper concentrations of metals on the finished catalyst for the intended catalyst use. Solution treatment temperatures and times are selected to ensure solution stability. Component weights, order of addition, treatment temperatures and treatment times required are typical and generally known to those skilled in the art.

Example 4

Catalyst Impregnating Metal Solution

Water (1000 g) was added to a glass kettle equipped with a heating mantle and overhead stirrer. Agitation was started and the water was heated to 120° F. After the water reached 120° F., ammonium dimolybdate crystals (235 g) were added to the kettle. Next, 28% aqueous ammonia (212 g) was slowly added to the kettle. Finally, nickel carbonate (81 g) was added to the kettle and the resulting solution was heated to 140° F. and held at temperature for one hour. The kettle was then allowed to cool before ceasing agitation.

Catalyst Preparation

Example 5

Alumina powder no. 2 as described above (820 lbs) was placed into an Eirich mixer along with metal-free and metal-containing recycle fines (75 and 20 lbs, respectively). A wet-mix was formed by adding water (1210 lbs) into the mixer. The wet-mix was mixed for 18 minutes and then extruded through a 4 inch Bonnot single auger extruder using dies with nominal 1 mm holes. The formed catalyst support particles were dried at 250° F. before being calcined at 1200° F. for 40 minutes.

The finished catalyst was prepared by impregnating the calcined support with a metals solution similar to that in Example 4 using the incipient wetness technique. The weights or amounts of water, metal solution and calcined support were selected such that the desired finished catalyst metal concentrations were obtained and the point of incipient wetness was reached. The required weights are readily determined by those skilled in the art. The impregnated extrudates were then calcined at 950° F. for 40 minutes to form the finished catalyst.

Example 6

Alumina powder no. 2, as described above, (1833 grams) was placed into a 10 liter Eirich Model R02 mixer. A wet-mix was formed by adding to the mixer a dilute nitric acid solution prepared from 75% nitric acid (18 g) and water (2236 g). The wet-mix was mixed on the low speed setting for 1 minute and on the high speed setting for 3 minutes. The wet-mix was then extruded through a 4 inch Bonnot single auger extruder using dies with nominal 1 mm holes. The formed catalyst support particles were dried overnight at 250° F. before being calcined at 1600° F. for 90 minutes.

The finished catalyst was made by impregnating the calcined support with a metals solution similar to that in Example 4 using the incipient wetness technique. Water, metal solutions and calcined base weights were selected such that the desired finished catalyst metal concentrations were obtained and the point of incipient wetness was reached. The required weights are readily determined by those skilled in the art. The impregnated extrudates were then calcined at 1000° F. for 30 minutes to form the finished catalyst.

Example 7

Alumina powder no. 2, as described above, (820 lbs) was placed into an Eirich mixer along with metal-free and metal-containing recycle fines (75 and 20 lbs, respectively). A wet-mix was formed by adding water (1210 lbs) into the mixer. This wet-mix was mixed for 18 minutes. The wet-mix was then extruded through a Bonnot single auger extruder using dies with nominal 1 mm holes. The formed catalyst particles were dried at 250° F. before being calcined at 1800° F. for one hour in a muffle furnace.

The finished catalyst was made by impregnating calcined base with metals solution similar to that in Example 4 using the incipient wetness technique. Water, metal solutions and calcined base weights were selected such that the desired finished catalyst metal concentrations were obtained and the point of incipient wetness was reached. The required weights are readily determined by those skilled in the art. The impregnated extrudates were then calcined at 950° F. for 60 minutes.

Example 8

Alumina powder no. 1, as described above, (2750 grams) was placed into a 10 liter Eirich R02 mixer. A wet-mix was formed by adding a dilute nitric acid solution prepared from 75% nitric acid (28 g) and water (3216 g) into the mixer. This wet-mix was mixed on the low speed setting for 1 minute and on the high speed setting for 3 minutes. The wet-mix was then extruded through a 4 inch Bonnot single auger extruder using dies with nominal 1 mm holes. The formed catalyst particles were dried overnight at 250° F. before being calcined at 1450° F. for 40 minutes.

The finished catalyst was made by impregnating calcined base with metals solution similar to that in Example 4 using the incipient wetness technique. Water, metal solutions and calcined base weights were selected such that the desired finished catalyst metal concentrations were obtained and the point of incipient wetness was reached. The required weights are readily determined by those skilled in the art. The impregnated extrudates were then calcined at 950° F. for 40 minutes.

Example 9

Alumina powder no. 1, as described above, (2750 grams) was placed into a 10 liter Eirich R02 mixer. A wet-mix was formed by adding to the mixer a dilute nitric acid solution prepared from 75% nitric acid (28 g) and water (3216 g). The wet-mix was mixed on the low speed setting for 1 minute and on the high speed setting for 3 minutes. The wet-mix was then extruded through a 4 inch Bonnot single auger extruder using dies with nominal 1 mm holes. The formed catalyst particles were dried overnight at 250° F. before being calcined at 1450° F. for 40 minutes.

The finished catalyst was made by impregnating calcined base with metals solution similar to that in Example 4 using the incipient wetness technique. Water, metal solutions and calcined base weights were selected such that the desired finished catalyst metal concentrations were obtained and the point of incipient wetness was reached. The required weights are readily determined by those skilled in the art. The impregnated extrudates were then calcined at 950° F. for 40 minutes. FIG. 1 illustrates the pore size distribution of the catalyst.

Example 10

Alumina powder no. 1 (3870 grams), commercially available, metals-free gamma alumina recycle fines (410 g), 75% nitric acid (240 g) and water (5480 g) were mixed in a low-shear mixer to form a wet-mix. The wet-mix was then extruded through a single auger extruder using dies with nominal 1 mm holes. The formed catalyst particles were dried at 290° F. before being calcined at 1400° F.

The finished catalyst was made by impregnating calcined base with a metals solution similar to that in Example 4 using the incipient wetness technique. Water, metal solutions and calcined base weights were selected such that the desired finished catalyst metal concentrations were obtained and the point of incipient wetness was reached. The required weights are readily determined by those skilled in the art. The impregnated extrudates were then calcined at 800° F.

Example 11—Comparative

Alumina powder no. 3, as described above, (1145 grams) was placed into an Eirich mixer. A wet-mix was formed by adding 7 g of nitric acid and 1170 g de-ionized water to the alumina powder. This wet-mix was mixed on the low speed setting for 1 minute and on the high speed setting for 3 minutes. Then 283 g of a second pseudoboehmite alumina powder (substantially the same as powder no. 3) was added to the Eirich mixer before mixing on high for 3 minutes. The wet-mix was then extruded through a Bonnot single auger extruder using dies with nominal 1 mm holes. The formed catalyst particles were dried overnight at 250° F. before being calcined at 1200° F. for one hour.

The finished catalyst was made by impregnating calcined base with metals solution similar to that in Example 4 using the incipient wetness technique. Water, metal solutions and calcined base weights were selected such that the desired finished catalyst metal concentrations were obtained and the point of incipient wetness was reached. The required weights are readily determined by those skilled in the art. The impregnated extrudates were then calcined at 950° F. for 60 minutes.

Example 12 (Comparative)

Pseudoboehmite alumina powder no. 2, as above, (820 lbs) was placed into an Eirich mixer along with metal-free and metal-containing recycle fines (75 and 20 lbs, respectively). A wet-mix was formed by adding water (1210 lbs) into the mixer. This wet-mix was mixed for 18 minutes. The wet-mix was then extruded through a Bonnot single auger extruder using dies with nominal 1 mm holes. The formed catalyst support particles were dried at 250° F. before being calcined at 1600° F. for 1 hour in a muffle furnace.

The finished catalyst was made by impregnating calcined base with metals solution using the incipient wetness technique. Water, metal solutions and calcined base weights were selected such that the desired finished catalyst metal concentrations were obtained and the point of incipient wetness was reached. The required weights are readily determined by those skilled in the art. The impregnated extrudates were then calcined at 950° F. for 60 minutes.

Example 13 (Comparative)

Pseudoboehmite alumina powder no. 3, as described above, (1428 grams) was mixed with methocel (93 g) and placed into an Eirich mixer. A wet-mix was formed by adding 7 g of nitric acid and 1168 g de-ionized water to the alumina powder. This wet-mix was mixed on the low speed setting for 1 minute and on the high speed setting for 3 minutes. The wet-mix was then extruded through a Bonnot single auger extruder using dies with nominal 1 mm holes. The formed catalyst particles were dried overnight at 250° F. before being calcined at 1200° F. for one hour.

The finished catalyst was made by impregnating calcined base with metals solution using the incipient wetness technique. Water, metal solutions and calcined base weights were selected such that the desired finished catalyst metal concentrations were obtained and the point of incipient wetness was reached. The required weights are readily determined by those skilled in the art. The impregnated extrudates were then calcined at 950° F. for 60 minutes.

TABLE 2

Catalyst Metal Composition

| Example | MoO₃ (wt. %) | NiO (wt. %) |
|---|---|---|
| Ref.* | 14.7 | 5.0 |
| 5 | 9.1 | 1.9 |
| 6 | 8.3 | 1.8 |
| 7 | 8.3 | 1.7 |
| 8 | 8.3 | 1.8 |
| 9 | 10.2 | 1.6 |
| 10 | 11.3 | 1.8 |
| 11 (C) | 8.3 | 1.7 |
| 12 (C) | 8.3 | 1.7 |
| 13 (C) | 8.8 | 1.5 |

*Reference catalyst: Commercial, state of the art catalyst prepared according to the disclosure of U.S. Pat. No. 7,642,212; (C) refers to Comparative Example as described above.

TABLE 3

Supported Catalyst Properties

| Example | SA (m²/g) | TIV* (cc/g) | d50 (Å) | Pore Mode (Å) | % PV <200 Å | % PV ≥1000 Å | % PV 200-<1000 Å |
|---|---|---|---|---|---|---|---|
| Ref. | 297 | 0.75 | 59 | 55 | 65 | 21 | 14 |
| 5 | 225 | 0.76 | 117 | 122 | 93 | 3 | 4 |
| 6 | 198 | 0.75 | 126 | 130 | 83 | 3 | 14 |
| 7 | 180 | 0.75 | 143 | 147 | 89 | 3 | 8 |
| 8 | 216 | 0.84 | 122 | 124 | 87 | 5 | 8 |
| 9 | 207 | 0.79 | 123 | 130 | 88 | 4 | 8 |
| 10 | 218 | 0.78 | 112 | 113 | 86 | 5 | 9 |
| 11 (C) | 222 | 0.87 | 116 | 113 | 75 | 12 | 13 |
| 12 (C) | 179 | 0.80 | 143 | 151 | 76 | 9 | 15 |
| 13 (C) | 261 | 0.87 | 100 | 84 | 82 | 3 | 15 |

*Total pore volume as measured by mercury intrusion method;
(C) refers to Comparative Example as described above.

The active catalysts prepared as described above were evaluated for performance Catalyst performance was evaluated in a fixed bed pilot plant using the following operating conditions which are described in further detail in U.S. Pat. No. 7,390,766 (incorporated herein to the extent permitted):

1. 100 cc of catalyst is charged to the pilot plant reactor.
2. The catalyst is heated to 350° F. in nitrogen and then hydrogen for catalyst dryout, followed by catalyst pre-sulfiding.
3. The pilot plant is operated at 0.6 LHSV and 780° F. for 3-4 days to stabilize the catalyst system. The operating condition is then changed to 0.2 LHSV and 790° F. to collect catalyst performance data. The pilot plant remains at this condition for 14-21 days in order to study the long-term deactivation behavior of the catalyst.
4. The liquid product is collected daily and analyzed for API, sulfur, MCR, nitrogen, metals, 1000F+ and sediment.

Performance was evaluated considering the following properties as reported in Tables 4 and 5 below: MCR, micro carbon residue, which is described in ASTM Method D4530; sediment, test method ASTM D4870 (also referred to in U.S. Pat. No. 5,928,499, Column 13, lines 31-42, incorporated herein by reference to the extent permitted).

Percent conversion for all parameters is calculated using the following equation:

[(amount $X$ in feed-amount $X$ in product)/amount $X$ in feed]*100

For example, in the case of 1000° F.+ conversion in percent, it would be the volume of 1000° F.+ boiling material in the feed minus the volume of 1000° F.+ boiling material in the product (over that same period of time); this quantity is divided by the volume of 1000° F.+ boiling material in the feed, the quantity multiplied by 100.

The same calculation procedure is used for sulfur and MCR.

As for sediment, sediment is the insoluble material (captured by filtration) that is found in the feed or product. This is to be contrasted with carbon residue which is the material left after pyrolyzing the feed or product. The sediment level for the resid feedstock is very low. There are both sediment molecules and sediment precursor molecules in the feed, but the sediment molecules are soluble in the feed and therefore are not captured via filtration. Upon conversion of the 1000° F.+ materials, the sediment precursor molecules become sediment molecules and it is believed that the solubility properties of the converted product are diminished compared to the feed. Therefore, more severe operations lead to higher observed sediment. More severe operations generally refers to, for example, increased conversion levels, operating at higher temperature which can lead to increased ratio of thermal to catalytic cracking, increased levels of demetallation (such as nickel and vanadium), etc. In the present context it refers to increased conversion. Less sediment is observed with better performing catalysts and, without wishing to be bound by theory, this is believed due to either production of fewer sediment molecules or conversion of the feed in such a way that the products have better solubility properties, or both.

Feedstock Used for Tests

| Feedstock Type Property | Ural Vacuum Resid Value |
|---|---|
| API Gravity | 7.4 |
| 1000° F.+, wt. % | 88.7 |
| Sulfur, wt. % | 3.04 |
| Total Nitrogen, wppm | 5889 |
| MCR, wt. % | 17.5 |
| Pentane Insolubles, wt. % | 12.38 |
| Heptane Insolubles, wt. % | 5.12 |
| Metals, wppm | |
| Ni | 65.9 |
| V | 206 |
| Na | <1 |
| D1160, wt % (° F.)* | |
| IBP | 799 |
| 5% | 947 |
| 10% | 991 |
| 20% | 1046 |
| 30% | 1089 |
| 40% | 1130 |
| 50% | 1176 |

*ASTM D1160-06 Standard Test Method for Distillation of Petroleum Products at Reduced Pressure; IBP = Initial Boiling Point. As described by the ASTM, this test method is used for the determination of the distillation characteristics of petroleum products and fractions that may decompose if distilled at atmospheric pressure. This boiling range is obtained at conditions designed to obtain approximately one theoretical plate fractionation.

Performance of the catalysts at equivalent conversion is reported in Table 4 below. In each instance it can be seen that the catalyst examples of the invention performed better than the comparative catalyst, in other words, improved 1000° F.+ conversion at equivalent sediment formation, improved sulfur conversion, and improved micro-carbon residue conversion, particularly at extended run length.

TABLE 4

Catalyst Performance

| Example | Alumina Powder | Resid Conversion | HDS | HDMCR | Sediment |
|---|---|---|---|---|---|
| Ref. | — | 72.3 | 80.8 | 53.8 | 2696 |
| 5 | 2 | 75.5 | 88.2 | 64.0 | 2421 |
| 6 | 2 | 75.5 | 86.3 | 61.5 | 2178 |
| 7 | 2 | 76.2 | 87.2 | 64.4 | 2726 |
| 8 | 1 | 76.5 | 87.5 | 61.7 | 3327 |
| 9 | 1 | 76.1 | 87.4 | 62.3 | 2924 |
| 10 | 1 | 76.0 | 88.5 | 63.1 | 3216 |
| 11 (C) | 3 | 71.9 | 79.0 | 53.4 | 1902 |
| 12 (C) | 2 | 72.6 | 83.1 | 57.9 | 2913 |
| 13 (C) | 3 | 73.2 | 85.9 | 61.1 | 3442 |

(C) refers to Comparative Example as described above

Alternative Embodiments

The following enumerated paragraphs illustrate various and alternative embodiments of the present invention:

1. A supported catalyst comprising at least one metal from Group 6, alternatively referred to as Group VIB, of the Periodic Table of the Elements, at least one metal from Groups 8, 9 or 10, alternatively referred to as Group VIII, of the Periodic Table of the Elements, and optionally comprising phosphorous, wherein said metals, and phosphorous when present, are carried on a foraminous carrier or support, said carrier or support having a total pore volume (TPV) of about 0.6 cc/g to about 1.1 cc/g and comprising:
   (a) equal to or greater than about 78% to about 95% of TPV in pores having a diameter of less than 200 Angstroms (Å);
   (b) greater than about 2% to less than about 19% of TPV in pores having a diameter of 200 (Å) to less than 1000 Å;
   (c) equal to or greater than 3% to less than 12% of TPV in pores having a diameter equal to or greater than 1000 Å; and
   (d) a pore mode equal to or greater than about 90 Å and less than about 160 Å.

2. A composition as in paragraph 1 further characterized in that said support exhibits a d50 greater than about 100 Å and less than about 150 Å.

3. A composition as in paragraph 1 further characterized in that greater than about 5% to less than about 19% of TPV is in pores having a diameter of 200 Å to less than 1000 Å.

4. A composition as in paragraph 1 further characterized in that equal to or greater than about 3% to less than about 10% of said TPV is in pores having a diameter equal to or greater than 1000 Å.

5. A composition as in paragraph 4 further characterized in that equal to or greater than about 5% to less than about 10% of said TPV is in pores having a diameter equal to or greater than 1000 Å.

6. A composition as in paragraph 1 wherein said foraminous carrier exhibits a substantially unimodal pore size distribution measured using mercury porosimetry.

7. A composition as in paragraph 6 wherein said pore size distribution includes an additional peak at greater than about 200 Å provided that the total volume of pores comprised in such additional peak is greater than about zero to about 10% of the total pore volume present in said porous alumina.

8. A composition as in paragraph 1 further characterized in that said metal of Group 6 is molybdenum and said metal of Groups 8, 9 and 10 is selected from the group consisting of cobalt, nickel and mixtures thereof.

9. A composition as in paragraph 8 further comprising phosphorous.

10. A catalyst useful in at least one process selected from the group consisting of:
   (I) hydroprocessing a petroleum feed;
   (II) hydrodesulfurization of hydrocarbons;
   (III) hydrodenitrification of hydrocarbons;
   (IV) hydrodemetallation of hydrocarbons; and
   (V) hydrotreating a charge hydrocarbon feed containing components boiling above 1000° F., and at least one component components selected from the group consisting of sulfur-containing compounds, nitrogen-containing compounds, metal-containing compounds, asphaltenes, carbon residue, sediment precursors, and mixtures thereof;
said catalyst comprising at least one metal from Group 6, alternatively referred to as Group VIB, of the Periodic Table of the Elements, at least one metal from Groups 8, 9 or 10, alternatively referred to as Group VIII, of the Periodic Table of the Elements, and optionally comprising phosphorous, wherein said metals, and phosphorous when present, are carried on a foraminous carrier or support, wherein: said support exhibits a total pore volume (TPV) of about 0.6 cc/g to about 1.1 cc/g and pore size distribution and contents corresponding to values as measured by the mercury porosimetry method:
- (1) equal to or greater than about 78% to about 95% of TPV in pores having a diameter of less than 200 Angstroms (Å);
- (2) greater than about 2% to less than about 19% of TPV in pores having a diameter of 200 Angstroms (Å) to less than 1000 Å; and
- (3) equal to or greater than 3% to less than 12% of TPV in pores having a diameter equal to or greater than 1000 Å; and
- (4) a pore mode equal to or greater than about 90 Å and less than about 160 Å.

11. The catalyst of paragraph 10 wherein said catalyst has been pre-impregnated, shaped, dried and calcined.

12. The catalyst of paragraph 10, further exhibiting a d50 greater than about 100 Å and less than about 150 Å.

13. A process for treating a hydrocarbon feedstock to produce treated products, said process selected from the group consisting of:
- (I) hydrodemetallation, hydrodenitrification, hydrodesulfurization, and hydrocracking, said process comprising contacting said feedstock in at least one reactor with hydrogen under hydrocracking conditions with a catalyst and recovering said product;
- (II) hydrotreating said hydrocarbon feed containing components boiling above 1000° F., and at least one component selected from the group consisting of sulfur-containing compounds, nitrogen-containing compounds, metal-containing compounds, asphaltenes, carbon residue, sediment precursors, and mixtures thereof, comprising contacting said feed with hydrogen and a catalyst at isothermal or substantially isothermal hydrotreating conditions and recovering said treated product;
- (III) hydroconverting said hydrocarbon feed having components exhibiting a boiling point greater than 1000° F. to form product having an increased proportion of components exhibiting a boiling point less than about 1000° F. comprising contacting said feed with hydrogen and a catalyst at isothermal or substantially isothermal hydrotreating conditions and recovering said product; and
- (D) hydroconverting said feed, comprising contacting said feed comprising a hydrocarbon oil with hydrogen and a catalyst under conditions of elevated temperature above about 600° F. and pressure above about 500 p.s.i.g. and recovering said product;

said catalyst comprising at least one metal from Group 6, alternatively referred to as Group VIB, of the Periodic Table of the Elements, at least one metal from Groups 8, 9 or 10, alternatively referred to as Group VIII, of the Periodic Table of the Elements, and optionally comprising phosphorous, wherein said metals, and phosphorous when present, are carried on a foraminous carrier or support, wherein: said support exhibits a total pore volume (TPV) of about 0.6 cc/g to about 1.1 cc/g and pore size distribution and contents corresponding to values as measured by the mercury porosimetry method:
- (1) equal to or greater than about 78% to about 95% of TPV in pores having a diameter of less than 200 Angstroms (Å);
- (2) greater than about 2% to less than about 19% of TPV in pores having a diameter of 200 Angstroms (Å) to less than 1000 Å;
- (3) equal to or greater than 3% to less than 12% of TPV in pores having a diameter equal to or greater than 1000 Å; and
- (4) a pore mode equal to or greater than about 90 Å and less than about 160 Å.

14. A process as in paragraph 13 wherein said contacting is carried out in at least one ebullated bed reactor or in at least one fixed bed reactor.

15. A method for preparing a catalyst useful in at least one process selected from the group consisting of:
- (I) hydroprocessing a petroleum feed;
- (II) hydrodesulfurization of hydrocarbons;
- (III) hydrodenitrification of hydrocarbons;
- (IV) hydrodemetallation of hydrocarbons; and
- (V) hydrotreating a charge hydrocarbon feed containing components boiling above 1000° F., and at least one component selected from the group consisting of sulfur-containing compounds, nitrogen-containing compounds, metal-containing compounds, asphaltenes, carbon residue, sediment precursors, and mixtures thereof;

said method comprising impregnating a porous alumina carrier with an aqueous solution comprising at least one catalytic agent or catalytic agent precursor selected from the group consisting of compounds of Group 6, alternatively referred to as Group VIB, of the Periodic Table of the Elements, and compounds of Groups 8, 9 or 10, alternatively referred to as Group VIII, of the Periodic Table of the Elements, and optionally comprising phosphorous, said compounds being thermally decomposable to the metal oxides and thereafter drying and calcining the resulting impregnated carrier, said carrier having been prepared by:
- (A) mixing pseudoboehmite alumina powder with water and optionally nitric acid to form a damp mix;
- (B) shaping the damp mix so as to form carrier particles suitable for use in a hydroprocessing reactor; and
- (C) drying and calcining the carrier particles to form calcined pills;

said carrier comprising porous alumina having a total pore volume (TPV) of about 0.6 cc/g to about 1.1 cc/g and the following pore size distribution and pore content corresponding to values as measured by the mercury porosimetry method:
- (i) equal to or greater than about 78% to about 95% of TPV in pores having a diameter of less than 200 Angstroms (Å);
- (ii) greater than about 2% to less than about 19% of TPV in pores having a diameter of 200 Å to less than 1000 Å;
- (iii) equal to or greater than 3% to less than 12% of said pore volume in pores having a diameter equal to or greater than 1000 Å; and
- (iv) a pore mode equal to or greater than about 90 Å and less than about 160 Å.

16. The catalyst of paragraph 10, further exhibiting a macroporous structure.

17. The catalyst of paragraph 13, further exhibiting a d50 greater than about 100 Å and less than about 150 Å.

18. The method of paragraph 15, said alumina carrier further characterized in that equal to or greater than about 3% to less than about 10% of said TPV is in pores having a diameter equal to or greater than 1000 Å.

19. A foraminous catalyst carrier or support having a total pore volume (TPV) of about 0.6 cc/g to about 1.1 cc/g and comprising:
(a) equal to or greater than about 78% to about 95% of TPV in pores having a diameter of less than 200 Angstroms (Å);
(b) greater than about 2% to less than about 19% of TPV in pores having a diameter of 200 (Å) to less than 1000 Å;
(c) equal to or greater than 3% to less than about 12% of TPV in pores having a diameter equal to or greater than 1000 Å; and
(d) a pore mode equal to or greater than about 90 Å and less than about 160 Å.

20. A support as in paragraph 19 further comprising a d50 greater than about 100 Å and less than about 150 Å.

21. A support as in paragraph 19 wherein said foraminous carrier comprises alumina.

22. A support as in paragraph 19 further characterized in that greater than about 5% to less than about 19% of TPV is in pores having a diameter of 200 Å to less than 1000 Å.

23. A support as in paragraph 19 further characterized in that equal to or greater than about 3% to less than about 10% of said TPV is in pores having a diameter equal to or greater than 1000 Å.

24. A support as in paragraph 23 further characterized in that equal to or greater than about 5% to less than about 10% of said TPV is in pores having a diameter equal to or greater than 1000 Å.

25. A support as in paragraph 19 wherein said foraminous carrier exhibits a substantially unimodal pore size distribution measured using mercury porosimetry.

26. A support as in paragraph 25 wherein said pore size distribution includes an additional peak at greater than about 200 Å provided that the total volume of pores comprised in such additional peak is greater than about zero to about 10% of the total pore volume present in said porous alumina.

All documents described herein are incorporated by reference herein, including any patent applications and/or testing procedures. The principles, preferred embodiments, and modes of operation of the present invention have been described in the foregoing specification.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed:

$$R=R_L+k(R_U-R_L),$$

wherein k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A supported catalyst for treating hydrocarbon feedstocks to produce treated products, said supported catalyst comprising at least one metal from Group 6, alternatively referred to as Group VIB, of the Periodic Table of the Elements, at least one metal from Groups 8, 9 or 10, alternatively referred to as Group VIII, of the Periodic Table of the Elements, and optionally comprising phosphorous, wherein said metals, and phosphorous when present, are carried on a foraminous carrier or support, said carrier or support having a unimodal pore size distribution, a total pore volume (TPV) of about 0.6 cc/g to about 1.1 cc/g and pore size distribution and contents corresponding to values measured by the mercury porosimetry method comprising:
(a) equal to or greater than about 78% to about 95% of TPV in pores having a diameter of less than 200 Angstroms (Å);
(b) greater than about 2% to less than about 19% of TPV in pores having a diameter of 200 (A) to less than 1000 Å;
(c) equal to or greater than 3% to less than 10% of TPV in pores having a diameter equal to or greater than 1000 Å; and
(d) a pore mode equal to or greater than about 90 Å and less than about 160 Å; and
wherein the TPV and pore distribution characteristics recited in (a)-(d) of the support and supported catalyst are calculated on a metals free basis.

2. A supported catalyst as in claim 1 further characterized in that said support exhibits a d50 greater than about 100 Å and less than about 150 Å.

3. A supported catalyst as in claim 1 further characterized in that greater than about 5% to less than about 19% of TPV is in pores having a diameter of 200 Å to less than 1000 Å.

4. A supported catalyst as in claim 1 further characterized in that equal to or greater than about 5% to less than about 10% of said TPV is in pores having a diameter equal to or greater than 1000 Å.

5. A supported catalyst as in claim 1 wherein said foraminous carrier or supported catalyst exhibits pore mode equal to or greater than 100 Å and less than 150 Å.

6. A supported catalyst as in claim 1 further characterized in that said metal of Group 6 is molybdenum and said metal of Groups 8, 9 and 10 is selected from the group consisting of cobalt, nickel and mixtures thereof.

7. A supported catalyst as in claim 6 further comprising phosphorous.

8. A catalyst for use in at least one process selected from the group consisting of:
(I) hydroprocessing a petroleum feed;
(II) hydrodesulfurization of hydrocarbons;
(III) hydrodenitrification of hydrocarbons;
(IV) hydrodemetallation of hydrocarbons; and
(V) hydrotreating a charge hydrocarbon feed containing components boiling above 1000° F., and at least one component components selected from the group consisting of sulfur-containing compounds, nitrogen-containing compounds, metal-containing compounds, asphaltenes, carbon residue, sediment precursors, and mixtures thereof;
said catalyst comprising at least one metal from Group 6, alternatively referred to as Group VIB, of the Periodic Table of the Elements, at least one metal from Groups 8, 9 or 10, alternatively referred to as Group VIII, of the Periodic Table of the Elements, and optionally comprising phosphorous, wherein said metals, and phosphorous when present, are carried on a foraminous carrier or support, wherein: said support exhibits a unimodal pore size distribution, a total pore volume (TPV) of about 0.6 cc/g to about 1.1 cc/g and pore size distribution and contents corresponding to values as measured by the mercury porosimetry method:
(1) equal to or greater than about 78% to about 95% of TPV in pores having a diameter of less than 200 Angstroms (Å);
(2) greater than about 2% to less than about 19% of TPV in pores having a diameter of 200 Angstroms (Å) to less than 1000 Å; and
(3) equal to or greater than 3% to less than 10% of TPV in pores having a diameter equal to or greater than 1000 Å; and
(4) a pore mode equal to or greater than about 90 Å and less than about 160 Å; and
wherein the TPV and pore distribution characteristics recited in (1)-(4) of the support and supported catalyst are calculated on a metals free basis.

9. The catalyst of claim 8 wherein said catalyst has been pre-impregnated, shaped, dried and calcined.

10. The catalyst of claim 8, further exhibiting a d50 greater than about 100 Å and less than about 150 Å.

11. A process for treating a hydrocarbon feedstock to produce treated products, said process selected from the group consisting of:
(I) hydrodemetallation, hydrodenitrification, hydrodesulfurization, and hydrocracking, said process comprising contacting said feedstock in at least one reactor with hydrogen under hydrocracking conditions with a catalyst and recovering said product;
(II) hydrotreating said hydrocarbon feed containing components boiling above 1000° F., and at least one component selected from the group consisting of sulfur-containing compounds, nitrogen-containing compounds, metal-containing compounds, asphaltenes, carbon residue, sediment precursors, and mixtures thereof, comprising contacting said feed with hydrogen and a catalyst at isothermal or substantially isothermal hydrotreating conditions and recovering said treated product;
(III) hydroconverting said hydrocarbon feed having components exhibiting a boiling point greater than 1000° F. to form product having an increased proportion of components exhibiting a boiling point less than about 1000° F. comprising contacting said feed with hydrogen and a catalyst at isothermal or substantially isothermal hydrotreating conditions and recovering said product; and
(IV) hydroconverting said feed, comprising contacting said feed comprising a hydrocarbon oil with hydrogen and a catalyst under conditions of elevated temperature above about 600° F. and pressure above about 500 p.s.i.g. and recovering said product;
said catalyst comprising at least one metal from Group 6, alternatively referred to as Group VIB, of the Periodic Table of the Elements, at least one metal from Groups 8, 9 or 10, alternatively referred to as Group VIII, of the Periodic Table of the Elements, and optionally comprising phosphorous, wherein said metals, and phosphorous when present, are carried on a foraminous carrier or support, wherein: said support exhibits a unimodal pore size distribution, a total pore volume (TPV) of about 0.6 cc/g to about 1.1 cc/g and pore size distribution and contents corresponding to values as measured by the mercury porosimetry method:
(1) equal to or greater than about 78% to about 95% of TPV in pores having a diameter of less than 200 Angstroms (Å);
(2) greater than about 2% to less than about 19% of TPV in pores having a diameter of 200 Angstroms (Å) to less than 1000 Å;
(3) equal to or greater than 3% to less than 10% of TPV in pores having a diameter equal to or greater than 1000 Å; and
(4) a pore mode equal to or greater than about 90 Å and less than about 160 Å; and
wherein the TPV and pore distribution characteristics recited in (1)-(4) of the support and supported catalyst are calculated on a metals free basis.

12. A foraminous catalyst support for a catalyst for treating hydrocarbon feedstocks to produce treated products, said support exhibiting a unimodal pore size distribution, having a total pore volume (TPV) of about 0.6 cc/g to about 1.1 cc/g and pore size distribution and contents corresponding to values as measured by the mercury porosimetry method, comprising:
(a) equal to or greater than about 78% to about 95% of TPV in pores having a diameter of less than 200 Angstroms (Å);
(b) greater than about 2% to less than about 19% of TPV in pores having a diameter of 200 (A) to less than 1000 Å;
(c) equal to or greater than 3% to less than 10% of TPV in pores having a diameter equal to or greater than 1000 Å; and
(d) a pore mode equal to or greater than about 90 Å and less than about 160 Å; and
wherein the TPV and pore distribution characteristics recited in (a)-(d) of the support and supported catalyst are calculated on a metals free basis.

13. A method for preparing a catalyst for use in at least one process selected from the group consisting of:
(I) hydroprocessing a petroleum feed;
(II) hydrodesulfurization of hydrocarbons;
(III) hydrodenitrification of hydrocarbons;
(IV) hydrodemetallation of hydrocarbons; and
(V) hydrotreating a charge hydrocarbon feed containing components boiling above 1000° F., and at least one component selected from the group consisting of sulfur-containing compounds, nitrogen-containing compounds, metal-containing compounds, asphaltenes, carbon residue, sediment precursors, and mixtures thereof;
said method comprising impregnating a porous alumina carrier with an aqueous solution comprising at least one catalytic agent or catalytic agent precursor selected from the group consisting of compounds of Group 6, alternatively referred to as Group VIB, of the Periodic Table of the Elements, and compounds of Groups 8, 9 or 10, alternatively referred to as Group VIII, of the Periodic Table of the Elements, and optionally comprising phosphorous—said compounds being thermally decomposable to the metal oxides and thereafter drying and calcining the resulting impregnated carrier, said carrier having been prepared by:
(A) mixing pseudoboehmite alumina powder with water and optionally nitric acid to form a damp mix;
(B) shaping the damp mix so as to form carrier particles suitable for use in a hydroprocessing reactor; and
(C) drying and calcining the carrier particles to form calcined pills;

said carrier comprising porous alumina having a unimodal pore size distribution, a total pore volume (TPV) of about 0.6 cc/g to about 1.1 cc/g and the following pore size distribution and pore content corresponding to values as measured by the mercury porosimetry method:
   (i) equal to or greater than 78% to 95% of TPV in pores having a diameter of less than 200 Å;
   (ii) greater than 2% to less than 19% of TPV in pores having a diameter of 200 Å to less than 1000 Å;
   (iii) equal to or greater than 3% to less than 10% of said pore volume in pores having a diameter equal to or greater than 1000 Å; and
   (iv) a pore mode equal to or greater than 90 Å and less than 160 Å, wherein pore mode means the pore diameter corresponding to the peak maximum of the pore size distribution; and
   wherein the TPV and pore distribution characteristics recited in (i)-(iv) of the support and supported catalyst are calculated on a metals free basis.

14. The method of claim 13 wherein the catalyst has been pre-impregnated, shaped, dried and calcined.

* * * * *